(12) United States Patent
Heeder et al.

(10) Patent No.: US 11,333,212 B2
(45) Date of Patent: May 17, 2022

(54) POSITION SENSING SYSTEM AND METHOD FOR GATHERING VEHICLE COMPONENT DATA

(71) Applicant: Sensata Technologies, Inc., Attleboro, MA (US)

(72) Inventors: Nicholas Heeder, Saunderstown, RI (US); Jacob Supron, Royal Oak, MI (US); Aditya Balasubramanian, Pawtucket, RI (US); Nevin Molyneaux, Crumlin (IE); Mark Duffy, Antrim (IE); Edward O'Brien, Rehoboth, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 129 days.

(21) Appl. No.: 16/223,460

(22) Filed: Dec. 18, 2018

(65) Prior Publication Data

US 2019/0120313 A1   Apr. 25, 2019

Related U.S. Application Data

(63) Continuation-in-part of application No. 15/647,785, filed on Jul. 12, 2017, now Pat. No. 10,532,725.

(51) Int. Cl.
*F16D 66/02* (2006.01)
*B60T 17/22* (2006.01)
*F16D 65/00* (2006.01)

(52) U.S. Cl.
CPC ............ *F16D 66/024* (2013.01); *B60T 17/22* (2013.01); *F16D 65/0062* (2013.01)

(58) Field of Classification Search
CPC .... B60T 17/22; F16D 66/024; F16D 65/0062; F16D 66/027; F16D 66/028
See application file for complete search history.

(56) References Cited

U.S. PATENT DOCUMENTS

| 3,601,794 A | * | 8/1971 | Blomenkamp | ........ B60Q 1/444 340/464 |
| 4,685,540 A | | 8/1987 | Rath et al. | |

(Continued)

FOREIGN PATENT DOCUMENTS

| CA | 2698459 A1 | 9/2011 |
| CN | 102803780 A | 11/2012 |

(Continued)

*Primary Examiner* — Melody M Burch
(74) *Attorney, Agent, or Firm* — Mark H. Williams

(57) ABSTRACT

A position sensing system and method for a braking assembly for a vehicle. The braking assembly includes a rotor, a caliper assembly disposed around the rotor and having a fixed mount bracket and a floating portion which moves when the brakes are applied. The position sensing system has a sensing element and a reference portion. The sensing element is attached to a location of the braking assembly such that the reference portion moves in relation to the sensing element when the floating portion moves. The sensor assembly is configured to generate a signal correlative to the relative positions of the sensing element and reference portion. The position sensing system includes a processor configured to store predetermined signatures and determine a condition of a component of the vehicle based on a match between the signal and one of the predetermined signatures.

14 Claims, 21 Drawing Sheets

(56) References Cited

U.S. PATENT DOCUMENTS

| | | |
|---|---|---|
| 4,850,454 A | 7/1989 | Korody |
| 6,042,079 A | 3/2000 | Hogenkamp |
| 6,257,374 B1 | 7/2001 | Strzelczyk et al. |
| 6,276,494 B1 | 8/2001 | Ward et al. |
| 6,285,132 B1 * | 9/2001 | Conley, III ............... H02J 9/02 |
| | | 315/129 |
| 6,481,539 B1 | 11/2002 | Shaw et al. |
| 8,310,356 B2 | 11/2012 | Evans et al. |
| 2004/0263324 A1 | 12/2004 | Sanchez et al. |
| 2006/0090968 A1 | 5/2006 | Taylor et al. |
| 2006/0149440 A1 | 7/2006 | Pettersson et al. |
| 2006/0177265 A1 * | 8/2006 | Cummings ............... E01F 9/30 |
| | | 404/9 |
| 2007/0279204 A1 * | 12/2007 | Adar .................. B60C 23/0413 |
| | | 340/447 |
| 2011/0168619 A1 | 7/2011 | Kuhnrich et al. |
| 2011/0240410 A1 | 10/2011 | Barrio et al. |
| 2014/0052318 A1 * | 2/2014 | Yoshida ............... B60L 3/0046 |
| | | 701/22 |
| 2014/0187106 A1 * | 7/2014 | Yamamoto ............. H01R 43/16 |
| | | 439/890 |
| 2014/0343722 A1 * | 11/2014 | Nancarrow ............ B65G 43/02 |
| | | 700/230 |
| 2016/0281808 A1 * | 9/2016 | Lamkin .................. B60T 17/22 |

FOREIGN PATENT DOCUMENTS

| | | |
|---|---|---|
| CN | 105673743 A | 6/2016 |
| EP | 2708771 A1 | 3/2014 |
| WO | 2018075352 A1 | 4/2018 |
| WO | 2018075439 A1 | 4/2018 |

* cited by examiner

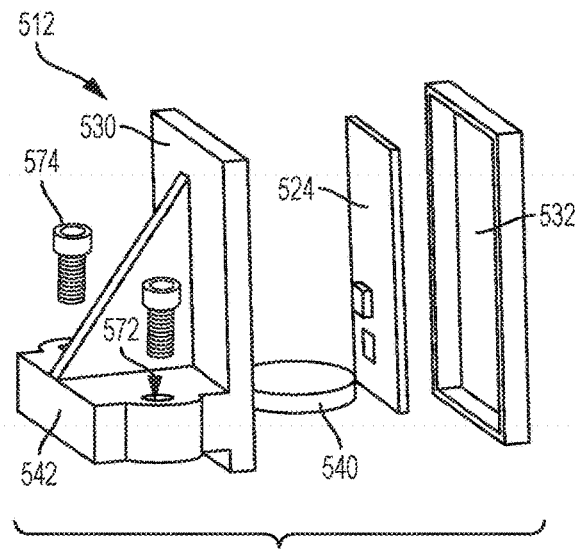
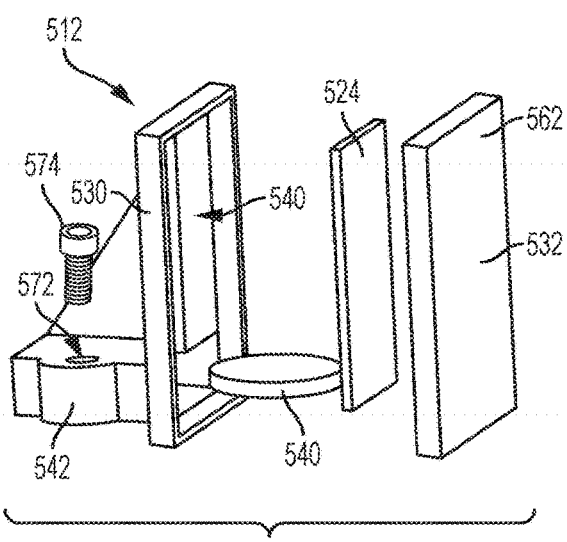
FIG. 10A  FIG. 10B
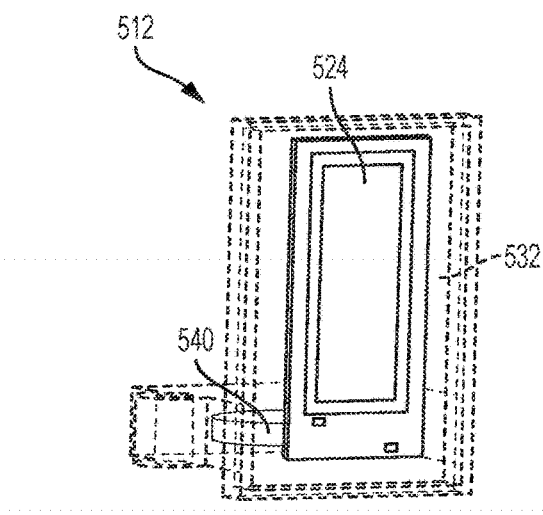
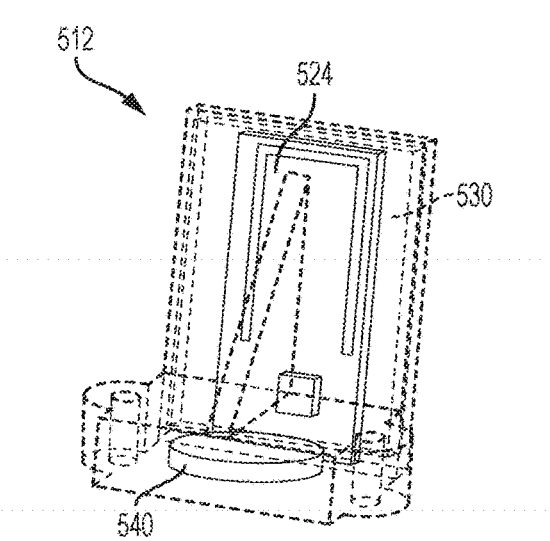
FIG. 10C  FIG. 10D

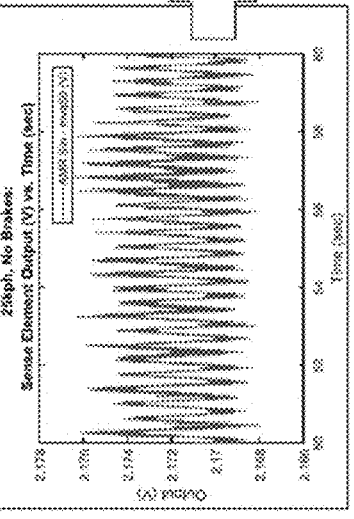

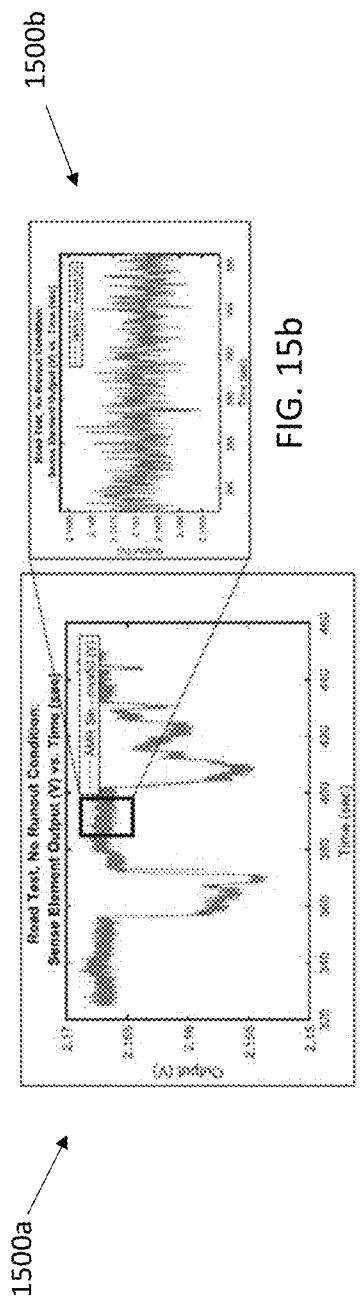
FIG. 15a
FIG. 15b
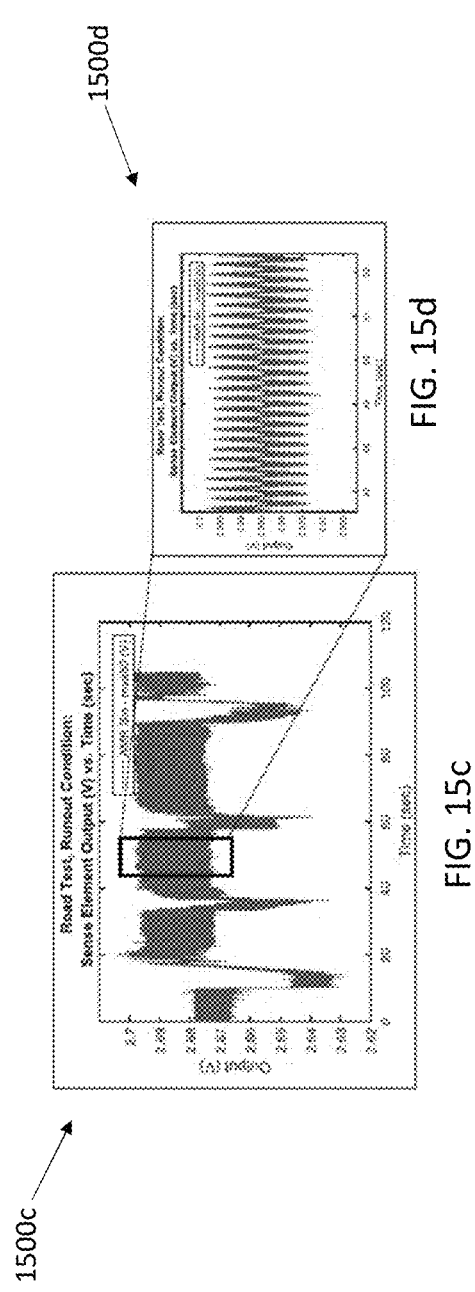
FIG. 15c
FIG. 15d

POSITION SENSING SYSTEM AND METHOD FOR GATHERING VEHICLE COMPONENT DATA

CROSS REFERENCE TO RELATED APPLICATIONS

This application is a continuation-in-part of U.S. Pat. No. 10,532,725, issued Jan. 14, 2020 and titled "POSITION SENSING SYSTEM FOR A BRAKING SYSTEM", the contents of which are incorporated herein by reference as though fully set forth herein.

FIELD OF THE INVENTION

The subject disclosure relates to sensing technology and more particularly to systems and methods of gathering data about a vehicle with a position sensor assembly for a braking system.

BACKGROUND OF THE INVENTION

Without a sensor for determining the wear of a brake pad, drivers are forced to remove one or more tires from their vehicle to determine the level of wear on their brake pads. The typical current market application for brake pad wear sensing consists of a device that indicates when the pad has sufficient wear to warrant replacement. The "sensor" typically consists of a wire that is broken when the pad wear reaches the point of the sensor causing the wire to be consumed during the braking process and leading to an open circuit. The open circuit is then used to indicate a light on the vehicle dashboard indicating that the brake pads need replacing. The sensor is consumed during the operational life of the brake pads and must be replaced when the brake pads are replaced at additional owner cost. Further, the wire harness for the brake pad wear sensor described above must be included in the vehicle architecture. This includes the complicated routing of a wire in the moving wheel suspension system as well as consuming connection points on vehicle system modules for the data acquisition.

Additionally, these simple and non-reusable sensors are fit for only a single purpose. Aside from brake pad wear data, these sensors fail to gather any other meaningful data about the components of a vehicle.

SUMMARY OF THE INVENTION

There is a market desire to have a system that regularly provides output regarding current brake pad wear. Further, there is a need for a system that is designed for the life of the vehicle rather than the life of the brake pads. There is yet a further desire for a system that can be connected to a central computer system where detailed information about the health of the vehicle is displayed for the driver and/or vehicle manufacturer so that, for example, the information can be used to time incentives sent to the owner for dealership service. For example, in autonomous and fleet shared vehicles, such a display could be of particular importance since the drivers might tend to be less concerned with the health of the vehicle.

In light of the needs described above, in at least one aspect, there is a need for a sensing system for a braking system which allows a user to identify the wear of a brake pad without removing the wheel of a vehicle. Further, in at least one aspect, the subject technology provides a sensing system for a braking system which is capable of regularly measuring brake pad wear and wirelessly transmitting those measurements. Further, in at least one aspect, the subject technology provides a sensing system for a braking system that can be easily integrated with existing braking systems and is not required to be removed when the user changes their brakes.

In one embodiment, the subject disclosure relates to a position sensing system for a braking system with a rotor and a caliper assembly disposed at least partially around the rotor, the caliper assembly having a fixed mount bracket and a floating portion. At least two brake pads are attached to the floating portion and are operable to exert a force against the rotor in response to a force through the floating portion. A first portion is coupled to the fixed mount bracket. A second portion is coupled to the floating portion such that the second portion moves in response to movement of the floating portion. A sensor assembly measures a distance between the first portion and the second portion. A wireless transmitter for sending a signal from the sensor assembly to remote electronics, the signal representing the distance measured. In one embodiment, the remote electronics include a microprocessor configured to receive the signal and calculate a value of brake pad wear based on the distance measured. The position sensing system can also include a display for showing the value of brake pad wear.

In some embodiments, the sensor assembly can be attached to the first portion and a magnet can be attached to the second portion. The sensor assembly can then measures the distance between the first portion and the second portion by sensing the distance between the magnet and the sensor assembly. In some embodiments, the magnet is attached to the first portion and the sensor assembly is attached to the second portion.

In some embodiments, the sensor assembly is the first portion, the sensor assembly being to the fixed mount bracket. The second portion can be a metallic reference portion coupled to the floating portion. The sensor assembly can then include an inductive sense element for measuring a distance between the inductive sense element and the metallic reference portion.

In some embodiments, the sensor assembly can include an electronics module assembly having a sense element, a printed circuit board, an antenna, a battery, and the wireless signal transmitter. The sensor assembly can also include a housing and a cover, the cover attaching to the housing to form a chamber containing the electronics module assembly. In some embodiments, the housing forms a channel around an axis, the magnet positioned to move along the axis in response to movement of the floating portion. The magnet and channel can be corresponding shapes, such as cylindrical.

In at least one embodiment, the subject technology relates to a wireless linear position sensing system for a braking system. The braking system includes a rotor and a caliper assembly disposed at least partially around the rotor. The caliper has a fixed mount bracket and a floating portion. At least two brake pads attach to the floating portion, the brake pads operable to exert a force against the rotor in response to a force through the floating portion. The wireless linear position system includes a magnet attached to first portion of the caliper assembly and a sensor assembly attached to a second portion of the caliper assembly. The sensor is configured to measure a distance between the magnet and the sensor. The wireless linear position sensor also includes a wireless transmitter for sending a signal from the sensor assembly to remote electronics, the signal representing the distance measured.

In some cases, the first portion of the caliper assembly can be located on the floating portion and the second portion of the caliper assembly can be located on the fixed mount bracket. In other cases, the first portion of the caliper assembly is located on the fixed mount bracket and the second portion of the caliper assembly is located on the floating portion. The sensor assembly can include an electronics module assembly having a sense element, a printed circuit board, an antenna, a battery, and the wireless signal transmitter.

In some embodiments, the subject technology relates to a wireless linear position sensing system for a braking system. The braking system includes a rotor and a caliper assembly disposed at least partially around the rotor having a fixed mount bracket and a floating portion. The floating portion has at least two ends disposed around the rotor and a brake pad attached to each end operable to exert a force against the rotor in response to a force through the floating portion. The wireless linear position system also includes a metallic reference portion coupled to one of the ends such that movement of said end causes a corresponding movement in the metallic reference portion. An inductive sensing assembly is attached to the fixed mount bracket and configured to measure the distance between the metallic reference portion and the inductive sensing assembly. A wireless transmitter sends a signal from the sensor assembly to remote electronics, the signal representing the distance measured.

The inductive sensing assembly can include an electronics module assembly having an inductive sense element, a printed circuit board, an antenna, a battery, and the wireless transmitter. In some embodiments, the inductive sensing assembly can also include a housing and a cover, the cover attaching to the housing to form a chamber containing the electronics module assembly. The housing can include a flange with a threaded axial bore for receiving a screw to removably attach the housing to the fixed mount bracket. Further, in some embodiments the cover and electronics module assembly are arranged parallel to a plane and movement of the floating portion causes the metallic reference portion to move parallel to the plane.

Further, in light of the needs described above, the subject technology relates to a system and method of detecting brake pad wear that can also produce data on the conditions of other components of the vehicle using the equipment used within the brake pad wear sensing system.

Additionally, in at least one aspect, the subject technology relates to a position sensing system for a braking assembly for a vehicle. The braking assembly includes a rotor, a caliper assembly disposed at least partially around the rotor and having a fixed mount bracket and a floating portion which is movable in relation to the fixed mount bracket, and at least one brake pad attached to the floating portion configured to move with respect to the fixed mount bracket and exert a force against the rotor when a driver applies brakes for the vehicle. The position sensing system includes a sensor assembly with a sensing element and a reference portion, the sensing element attached to a location of the braking assembly such that the reference portion moves in relation to the sensing element when the floating portion moves. The sensor assembly is configured to generate a signal correlative to the relative positions of the sensing element and the reference portion. A processor is configured to store at least one predetermined signature associating a signal waveform with a condition of a component of the vehicle and determine a condition of a component of the vehicle based on a match between the signal and one of the predetermined signatures.

In some embodiments, the sensing element is an inductive sensor assembly coupled to the fixed mount bracket and the reference portion is a metallic reference portion coupled to the floating portion. In some cases, the reference portion is a magnet that generates a magnetic field and the sensing element is a magnetic sense element configured to sense the magnetic field of the magnet to generate the signal. The predetermined signatures associate a pattern of signal strength over time with of a condition of a component of the vehicle. In some embodiments, the first predetermined signature of the predetermined signatures associates a fluctuation in signal strength with a non-uniform rotor contact surface, the processor configured to determine characteristics of a non-uniform contact surface of the rotor based on a match between the signal and the first predetermined signature. The predetermined signatures can include a first predetermined signature associating a first sensor output range with a straight steering angle, a second predetermined signature associating a second sensor output range with a left steering angle, and a third predetermined signature associating a third sensor output range with a right steering angle. The processor can then be configured to determine a steering angle over a time period based on a match between the signal and at least one of the first, second, and third predetermined signatures.

In some embodiments, the processor is further configured to determine a frequency for the signal over a time period. Failure of a component in the brake assembly can be determined by the processor based on whether the frequency falls outside of a predetermined frequency range. The processor is further configured to determine whether a wheel bearing proximate to the sensing assembly needs to be replaced based on whether the frequency falls outside of a predetermined frequency range. The processor can further be configured to determine a frequency of the signal and identify a speed of the vehicle based on the frequency of the signal.

In some embodiments, the sensor assembly includes a temperature sensing element configured to detect temperature. The processor can then be further configured to store at least one threshold temperature corresponding to a severe braking application. The processor can further determine, based on a temperature detected by the temperature sensing element, if a severe braking application has occurred. In some cases, the sensor assembly includes a temperature sensing element configured to detect temperature and the processor is configured to store at least one predetermined temperature signature associating detected temperature with a condition of a component of the vehicle. The processor can then determine a condition of a component of the vehicle based on a match between the detected temperature and one of the predetermined temperature signatures.

In some embodiments, at least one of the predetermined signatures includes an amplitude-frequency waveform. The processor is then further configured to convert the signal into an amplitude-frequency domain and identify a condition of a component of the vehicle based on a comparison of the converted signal with one of the predetermined signatures. The predetermined signatures including amplitude-frequency waveforms can include waveforms of abnormal amplitude spikes at particular frequencies dependent on vehicle speed, said waveforms being indicative of a non-uniform rotor contact surface. In some embodiments, at least one predetermined signature relates to a moving average of the signal exceeding a threshold value being associated with a worn brake pad.

In at least one aspect, the subject technology relates to a method for determining a condition of a component of a vehicle, the vehicle including a braking assembly. The braking assembly includes a rotor, a caliper assembly disposed at least partially around the rotor and having a fixed mount bracket and a floating portion which is movable in relation to the fixed mount bracket, and at least one brake pad attached to the floating portion configured to move with respect to the fixed mount bracket and exert a force against the rotor when a driver applies brakes for the vehicle. The method includes providing a sensor assembly with a sensing element and a reference portion. The sensing element is attached to a location of the braking assembly such that the reference portion moves in relation to the sensing element when the floating portion moves. The sensor assembly is configured to generate a signal correlative to the relative positions of the sensing element and the reference portion. At least one predetermined signature is determined which associates a signal waveform with a condition of a component of the vehicle. The predetermined signatures are stored in the processor. The processor determines a condition of a component of the vehicle based on a match between the signal and one of the predetermined signatures.

In some embodiments, the predetermined signatures associate a pattern of signal strength over time with a condition of at least one component of the vehicle. The predetermined signatures can include a first predetermined signature associating a first sensor output range with a straight steering angle. A second predetermined signature can associate a second sensor output range with a left steering angle. A third predetermined signature can associate a third sensor output range with a right steering angle. The processor then determines a steering angle over a time period based on a match between the signal and at least one of the first, second, and third predetermined signatures.

In some embodiments, the processor determines a frequency for the signal over a time period. The processor then determines whether a wheel bearing proximate to the sensing assembly needs to be replaced based on whether the frequency falls outside of a predetermined frequency range.

In some embodiments, the sensor assembly includes a temperature sensing element configured to detect temperature. The processor then stores at least one threshold temperature corresponding to a severe braking application. Finally, the processor determines, based on a temperature detected by the temperature sensing element, if a severe braking application has occurred. In some embodiments, at least one of the predetermined signatures includes an amplitude-frequency waveform and the processor then converts the signal into an amplitude-frequency domain and identifies a condition of a component of the vehicle based on a comparison of the converted signal with the predetermined signatures. In some cases, the at least one predetermined signature relates to a moving average of the signal exceeding a threshold value being associated with a worn brake pad.

BRIEF DESCRIPTION OF THE DRAWINGS

So that those having ordinary skill in the art to which the disclosed system pertains will more readily understand how to make and use the same, reference may be had to the following drawings.

FIG. 10A is an exploded view of the sensor assembly of FIGS. 8 and 9.

FIG. 10B is an exploded view of the sensor assembly of FIGS. 8 and 9.

FIG. 10C is a front view of the sensor assembly of FIGS. 8 and 9 with the housing and cover shown in broken line.

FIG. 10D is a rear view of the sensor assembly of FIGS. 8 and 9 with the housing and cover shown in broken line.

FIG. 14a is a graph showing signal strength as measured by a position sensing system in accordance with the subject technology over time.

FIG. 14b is a graph showing a conversion of the signal of FIG. 14a into the amplitude-frequency domain.

FIG. 14c is a graph showing signal strength as measured by a position sensing system in accordance with the subject technology over time.

FIG. 14d is a graph showing a conversion of the signal of FIG. 14c into the amplitude-frequency domain.

FIG. 15a is a graph showing signal strength as measured by a position sensing system in accordance with the subject technology over time.

FIG. 15b is a graph showing a sample of the signal of FIG. 15a.

FIG. 15c is a graph showing signal strength as measured by a position sensing system in accordance with the subject technology over time.

FIG. 15d is a graph showing a sample of the signal of FIG. 15c.

DETAILED DESCRIPTION

Figure 1:
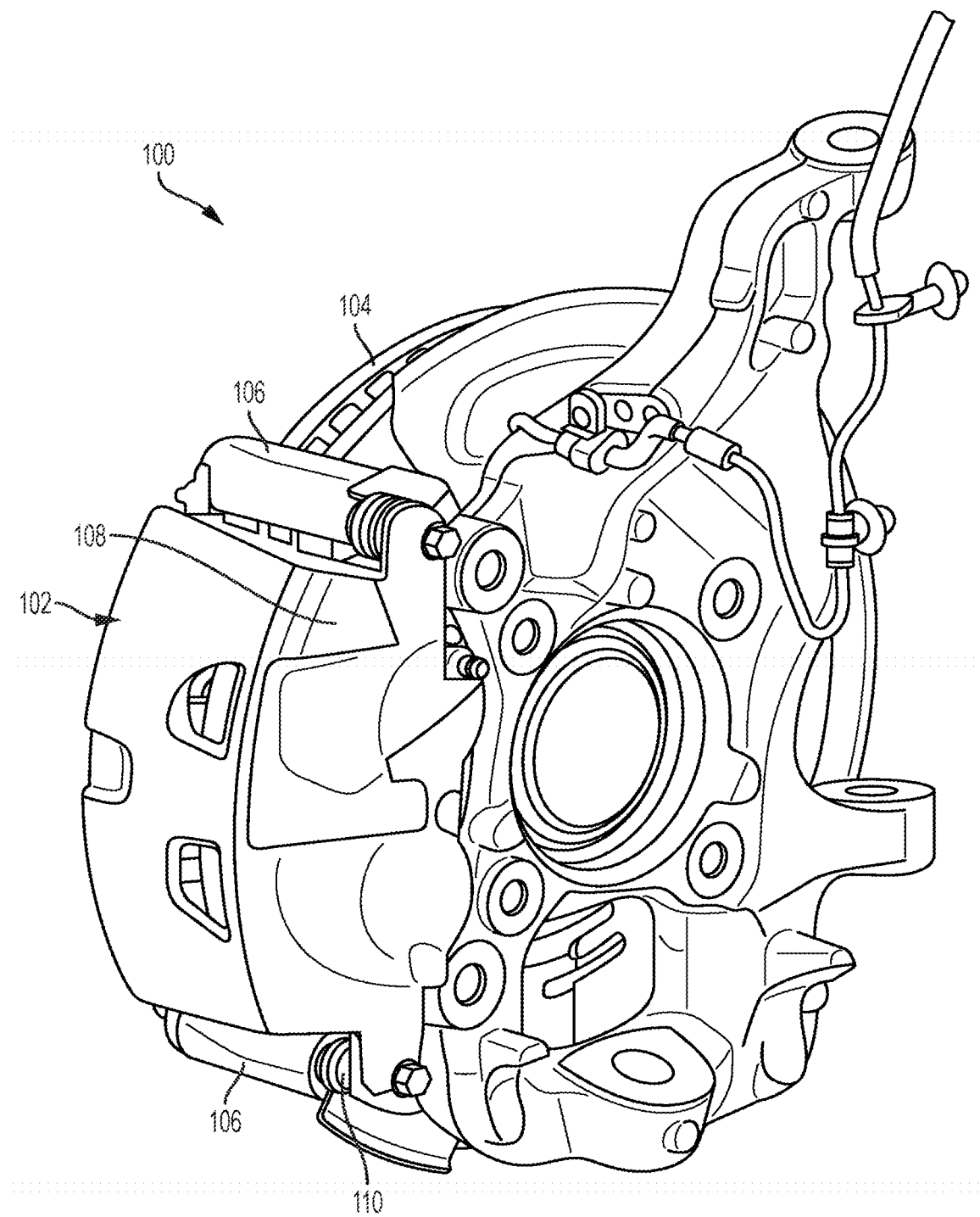
FIG. 1 is a perspective view of a typical braking system.

The subject technology overcomes many of the prior art problems associated with tracking brake pad wear. In brief summary, the subject technology provides a position sensing system, such as a wireless linear position sensing system, which tracks brake pad wear regularly over the life of the system. The position sensing system can also be used to gather data about the condition of other components of the vehicle. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, a typical braking system for a vehicle is shown generally at 100. The system 100 includes a caliper assembly 102 disposed partially around a rotor 104. The caliper assembly 102 includes a fixed mount bracket 106 and a floating portion 108. The fixed mount bracket 106 is statically attached to other components of the braking system 100. On the other hand, the floating portion 108 is coupled to the fixed mount bracket 106 by caliper slide pins 110 to allow movement towards and away from the rotor 104. The interior of the floating portion 108 usually contains at least two brake pads (not distinctly shown) surrounding the rotor 104. Holding the brake pads within the floating portion 108 can be accomplished by fixing the brake pads to two ends within the floating portion 108 which have fasteners for holding the brake pads in place. In any case, when a force is applied to the floating portion 108, for example by hydraulic fluid provided in response to the compression of a brake pedal within the vehicle, the floating portion 108 clinches the brake pads against the rotor 104. In turn, the brake pads apply a force to the rotor 104 to slow down and/or stop the vehicle. Notably, the braking systems shown herein are exemplary only, and it should be understood that the subject technology is equally applicable with other types of braking systems, as are known in the art. For example, the subject technology can also be implemented in a braking system with a fixed caliper and opposing moving pistons with attached brake pads on either side of the rotor. In general, the subject technology may be implemented with any braking system which includes a fixed portion, and a moveable portion that is actuated during breaking of the vehicle.

Figure 2:
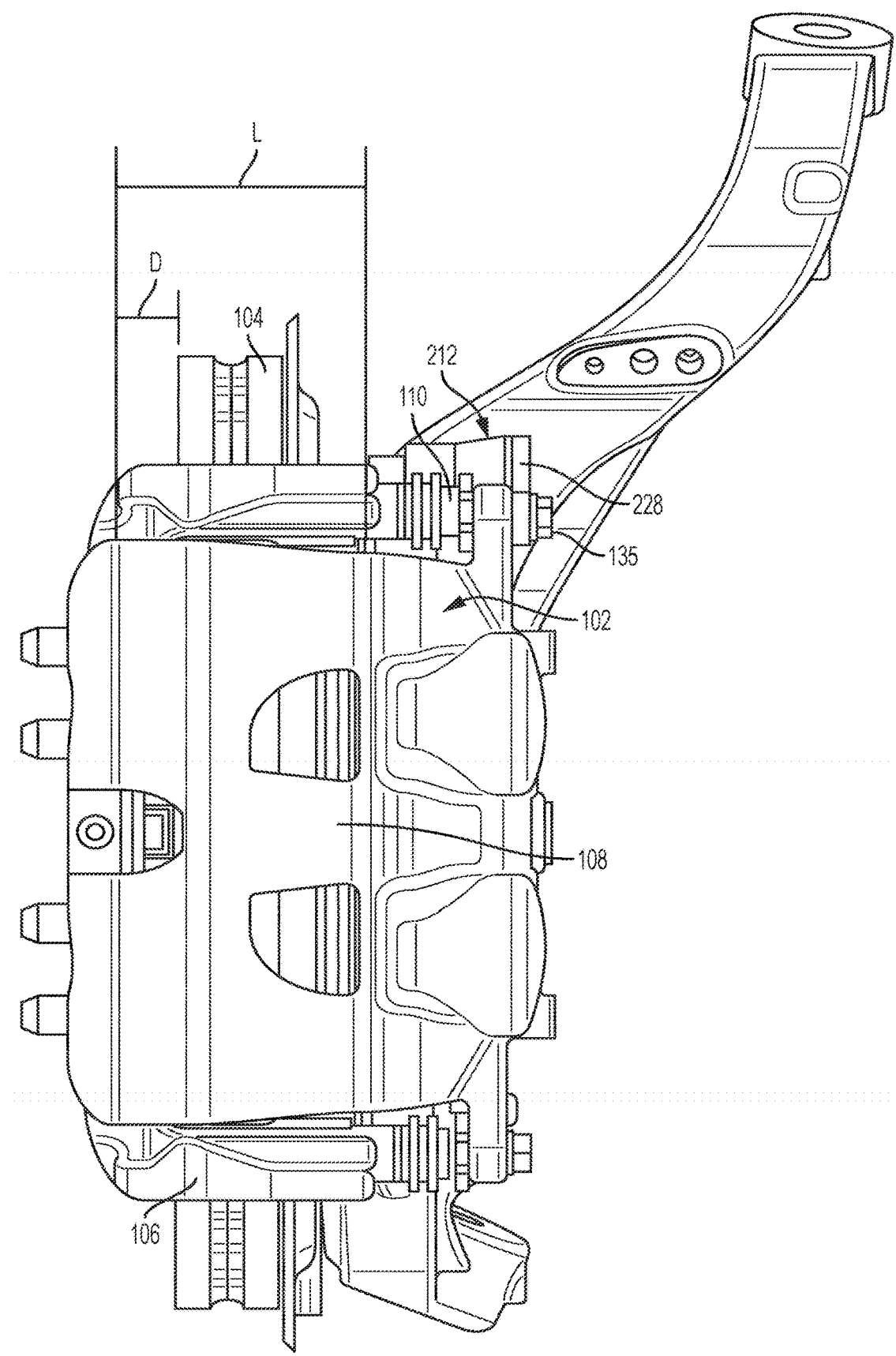
FIG. 2 is a top view of a braking system having a position sensing system in accordance with the subject technology.
Figure 3:
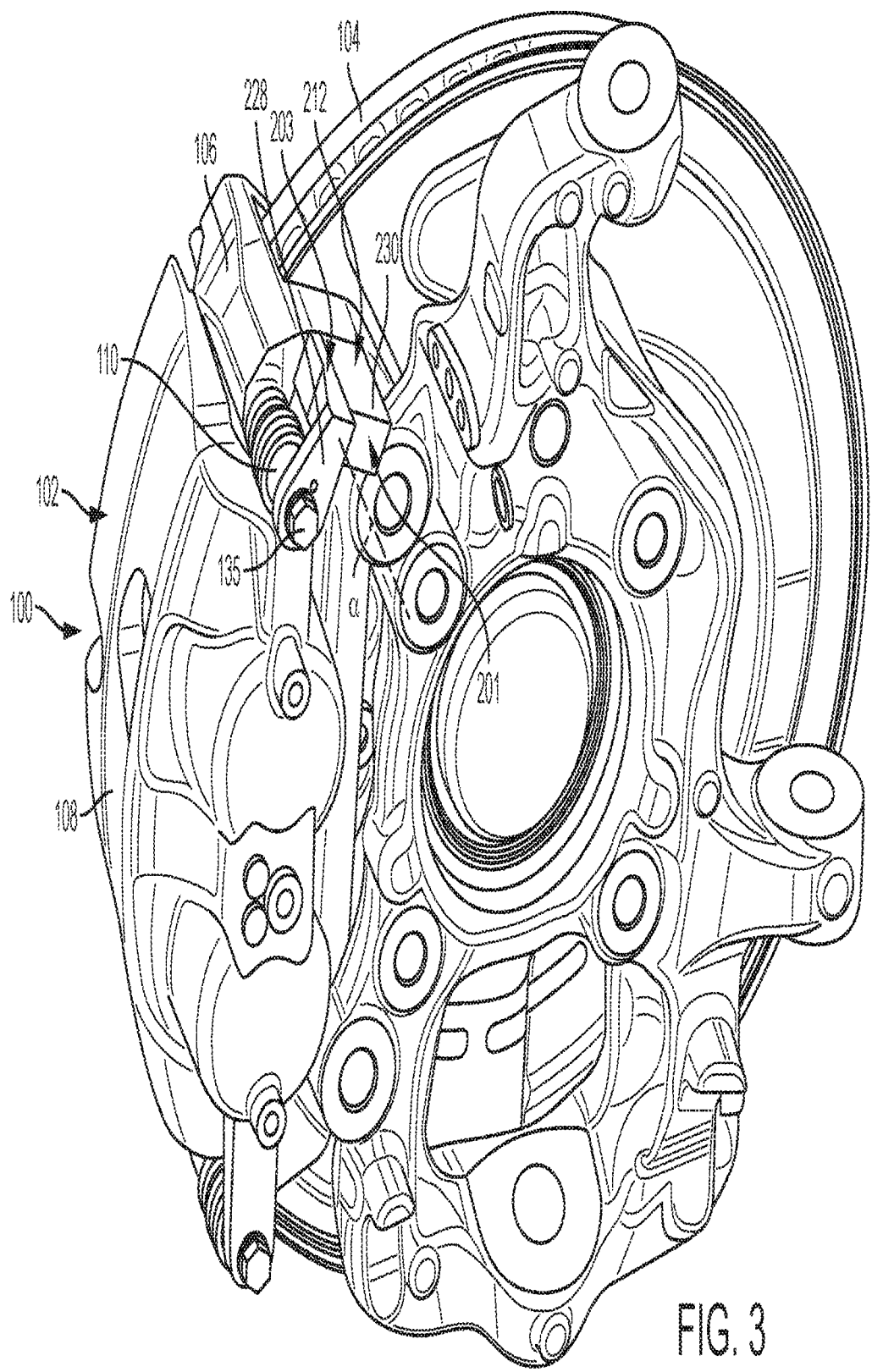
FIG. 3 is a perspective view of a braking system including an embodiment of a position sensing system in accordance with the subject technology.
Figure 4:
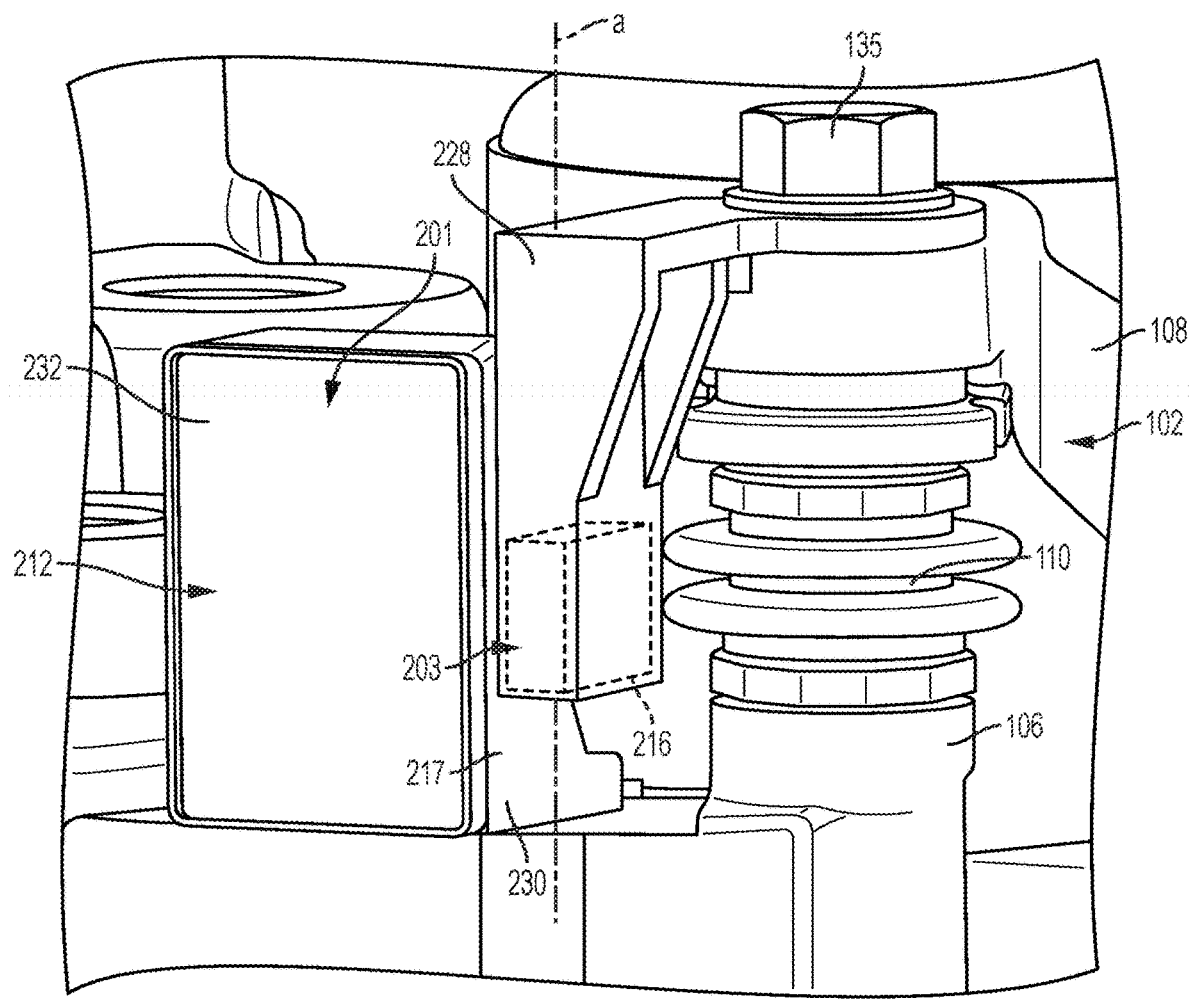
FIG. 4 is a zoomed in perspective view of the system of FIG. 3.

Referring now to FIGS. 2-4, the braking system 100 includes a sensor assembly 212 that senses positional data. The sensor assembly 212 preferably uses a magnet 216 so that the operation is contactless, as described more fully herein.

Figures 5A, 5B:
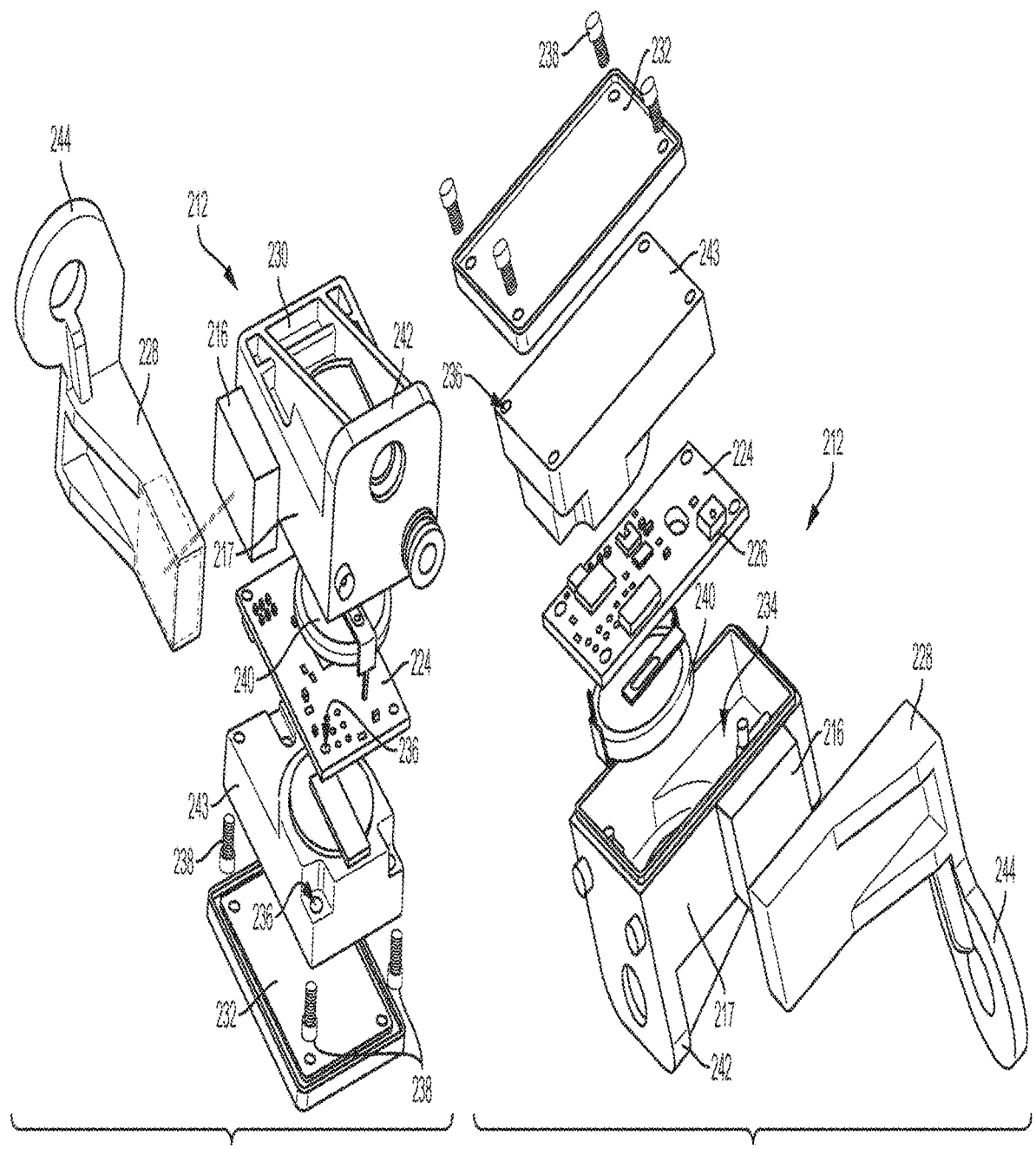
FIG. 5A is an exploded view of the position sensing system of FIG. 3.
FIG. 5B is an exploded view of the position sensing system of FIG. 3.
Figure 6A:
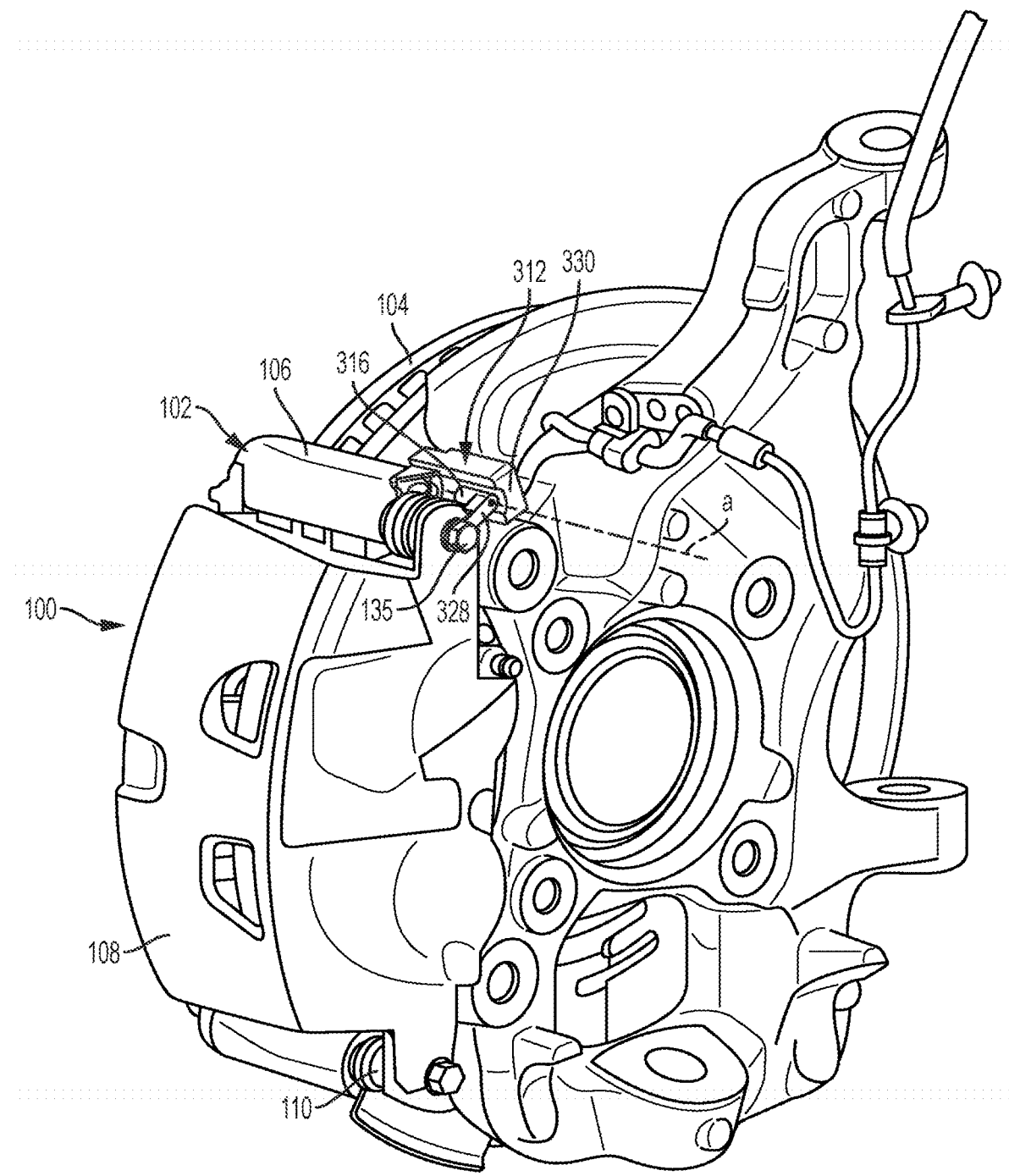
FIG. 6A is a perspective view of an alternative braking system including an embodiment of a position sensing system in accordance with the subject technology.
Figure 6B:
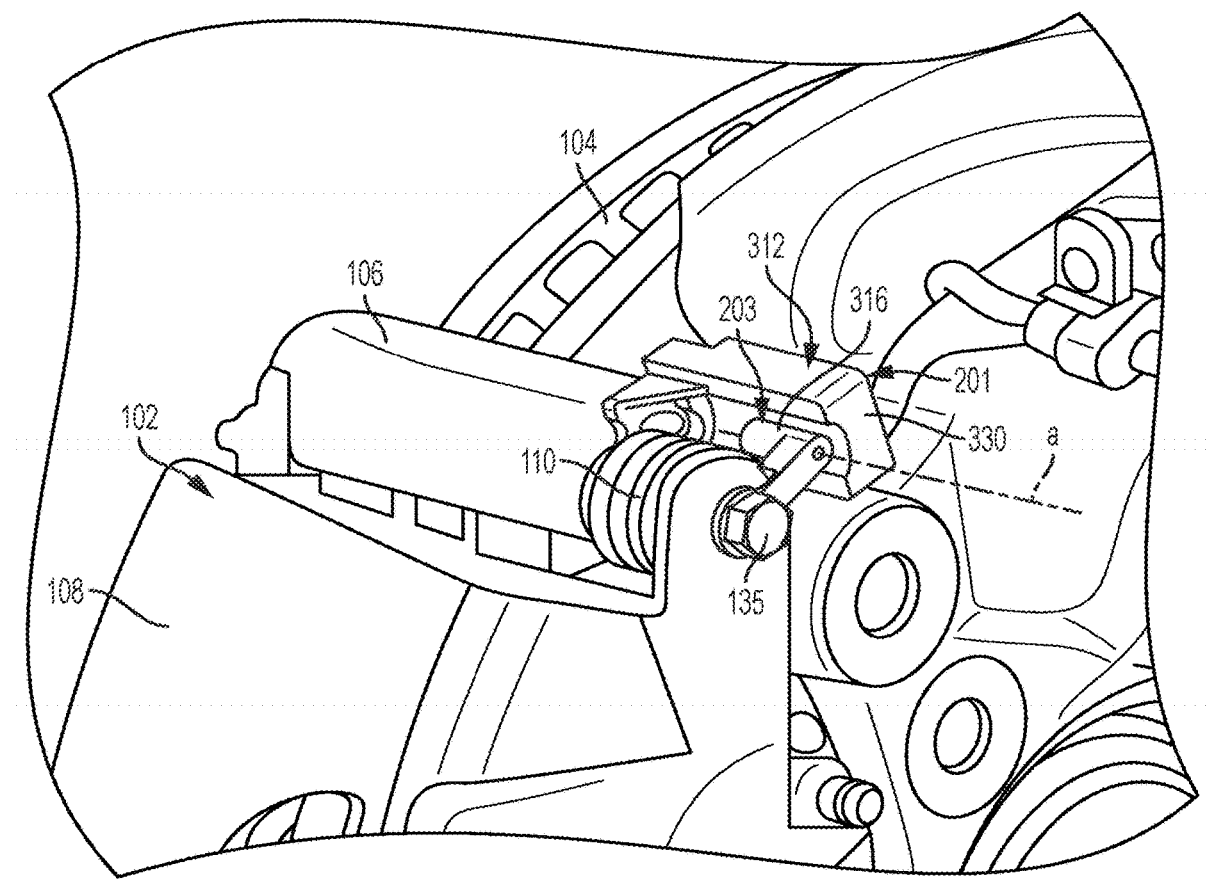
FIG. 6B is a zoomed in perspective view of system of FIG. 6A.
Figure 6C:
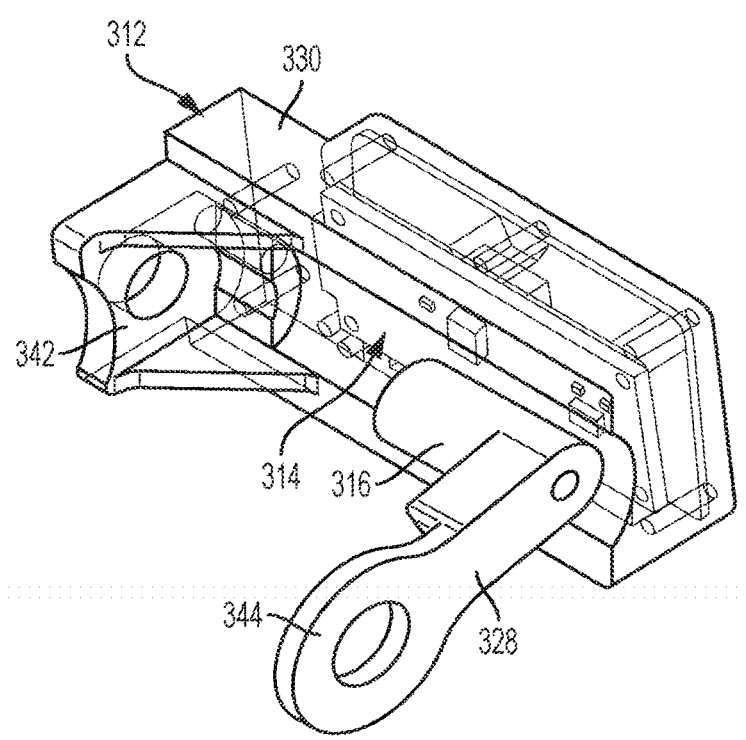
FIG. 6C is a perspective view of the sensor assembly of FIG. 6A.
Figure 6D:
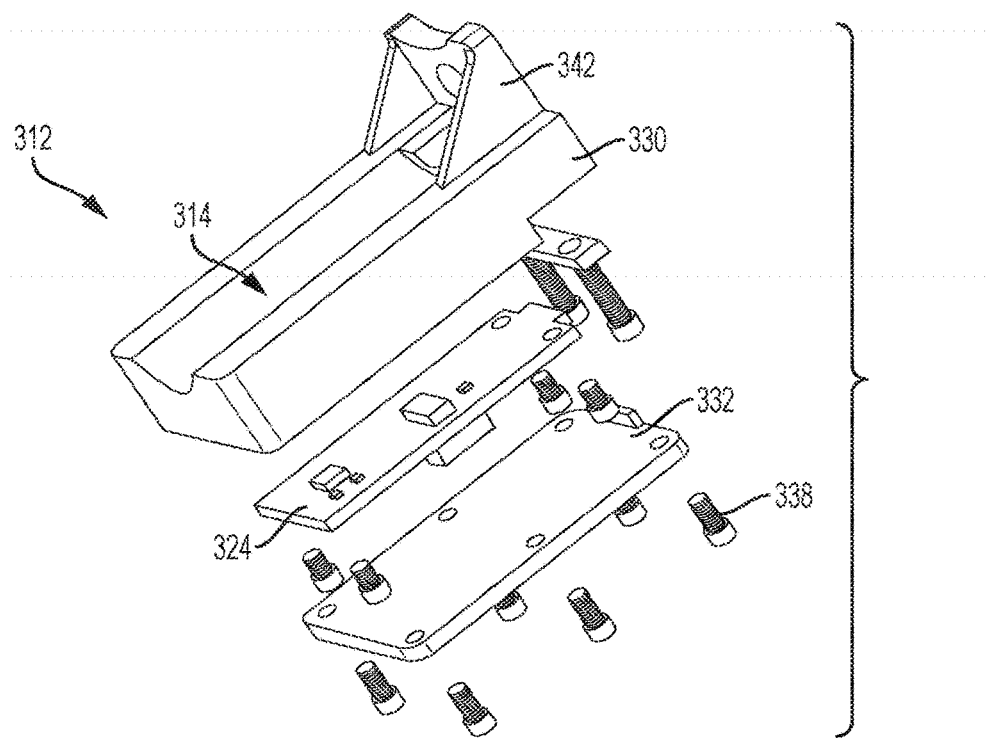
FIG. 6D is an exploded view of the sensor assembly of FIG. 6A.
Figure 6E:
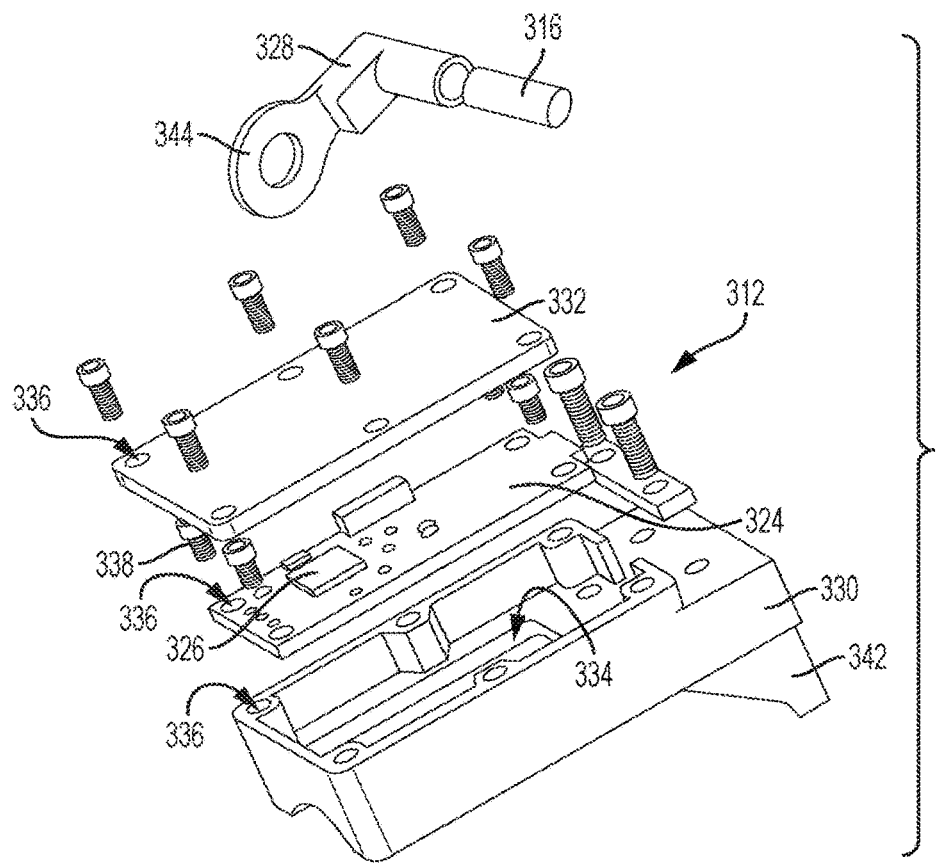
FIG. 6E is an exploded view of the sensor assembly of FIG. 6A.

The positional data relates to distance between a first portion 201 and a second portion 203 of the caliper assembly 102 to determine brake pad wear. The first portion 201 is mounted to the fixed mount bracket 106 via a rigid exterior housing 230. The housing 230 is attached to a cover 232 around an electronics module assembly 224. The electronics module assembly 224 includes at least one sense element 226 (FIG. 5B). Generally, the sense element 226 generates a signal that indicates a distance between the sense element 226 and the magnet 216, which is fixed on the second portion 203. The signal strength varies proportionally to the distance so that changes in signal strength can be calibrated to represent changes in the distance. The sense element 226 may be a Hall effect type sensor, a semiconductor based magnetic field sensor, and other types now known or later developed. In other embodiments, the sensor assembly 212 may utilize other contactless technology to determine the distance such as optical devices, capacitive sensors, inductive sensors, sonar, radar and the like.

The sense element 226 is a fixed magnetic position sense element, which senses the position of the magnet 216, which moves. Here, the magnet 216 is part of the second portion 203 of the sensor assembly 212. The magnet 216 is coupled to the floating portions 108 via a carrier 228. The magnet carrier 228 is coupled to one of the caliper slide pins 110. When the brake pads are not in use, the floating portion 108 sits in a first fixed position where there is a distance "L" between the inner most portion of the brakes pads and a distance "D" between the inner most portion of each brake pad and the rotor 104 (see FIG. 2). Notably, when the brake pads are in use, the brake pads are forced against the rotor 104 and therefore are displaced a distance roughly equal to "D" to cause the brake pads to contact the rotor 104. In the actuated position, when the floating portion 108 moves towards the rotor 104, the outside nut 135 around the caliper pin 110 forces the magnet carrier 228, and therefore the magnet 216, to move in accordance with the movement of the floating portion 108.

It should be noted that while the example embodiments show one effective way to attach the magnet 216 to the floating portion 108, the subject technology can also be practiced when the magnet 216 and floating portion 108 are coupled in other ways so long as the position of the magnet 216 changes when the brake system 100 actuates (e.g., the floating portion 108 moves). In the particular embodiment shown, the magnet 216 moves along magnet axis "a", parallel to the movement of the floating portion 108 and parallel to the length of the respective housing 230.

As the brake pads wear down, applying the brakes will cause the floating portion 108 to move closer to the rotor 104 (since the width of the brake pads between the rotor 104 and floating portion 108 will be diminished), resulting in a larger displacement distance "D" of the floating portion 108 as the brakes are applied. As the brakes wear down, this in turn results in a change in the position of the magnet 216 with respect to the sense element 226 when the brakes are applied. The sensor assembly 212 is configured to generate a signal having a strength that is based on, for example, the strength and/or angle of the magnetic field sensed by the sense element 226, which is changed depending on the relative positions of the magnet 216 and sense element 226. The signal strength, therefore, will be correlative with the relative position of between the magnet 216 and the sense element 226. The strength of this signal can then be relied upon to determine the relative position of the brake pads when the brakes are applied versus when they are not applied, which is indicative of brake pad wear.

The positional data is processed by the electronics module assembly 224, which can include an ASIC, microprocessor, or the like, to convert data received from the sense element 226 regarding the distance (or displacement) to the respective magnet 216 into a value representing brake pad wear. The electronics module assembly 224 may also only partially process the positional data with most of the processing being performed remotely.

The brake pad wear value given can represent the width of the brake pad between the caliper assembly 102 and the rotor 104. A wireless transmitter can then transmit the signal which is representative of the distance "D" (and/or the value of brake pad wear) to remote electronics within the vehicle. For example, the signal could be wirelessly transmitted to a display within the interior of the vehicle so that a user can track brake pad wear continuously, such as every time the brakes are applied or periodically at defined time-based intervals (e.g. every five minutes). By displaying a value of brake pad wear as the brake pads wear down, the user can easily predict when the brake pads might need to be replaced. This information can also provide an accurate assessment and prediction of brake pad health over the life of the brake pads. Further, the amount of brake pad wear caused by a specific driver, trip, or the like, can be found by viewing brake pad wear values before and after the vehicle is used. A maintenance technician may also utilize the positional data/indication of brake wear via a maintenance device to assess recommended and required maintenance activity like changing the brake pads.

In other applications, the brake pad data generated by the sensor assembly 212 can be relied upon for safety measures, such as detecting improper caliper function/operation, advanced insight of driver behavior, or possible brake failure. For example, the sensor assembly 212 on each caliper assembly 102 will generate a first sensor reading when the brakes are not in use. Each sensor assembly 212 on each caliper assembly 102 will also generate a second sensor reading when the brakes are in use, the differences between the first and second sensor readings can then be relied upon to calculate the amount which the floating portion 108 moved when the brake was activated, and ultimately, the brake pad wear. However, if there is a significant deviation between the signal difference determined for one wheel as compared to another, this could potentially alert the driver to a problem with caliper assembly 102 or a failure of the braking system 100. Likewise, ranges of likely second sensor readings can be generated based on the known distance between the floating portion 108 of the caliper assembly 102 and the rotor 104, current brake pad wear, and expected brake pad compression given the brake pad pressure load or degree to which the brakes were applied (e.g. the brake pads will be expected to compress to different degrees if the user lightly taps the brakes versus if they slam on the brakes for an emergency stop). Notably, this example will also require some input regarding the degree to which the brakes were applied during one or more braking events. The second sensor reading can then be compared to an expected second sensor reading and if there is a significant deviation. Whether a particular deviation is significant can be determined on a case by case basis or based on compiled data for past known deviations from that particular vehicle or from a number of vehicles.

Data tracked and reported by the sensor assembly 212 can also be relied on for diagnostic information such as brake pad activation and caliper motion during braking events. This data can be used, for example, to detect potential problems with the braking system 100, report the performance of a particular braking system 100 or parts thereof, or track brake usage of a given user or vehicle.

It should be noted that while the example above is given for explanatory purposes, in different embodiments the components associated with the first portion 201 and the second portion 203 could be reversed. For example, the sensor assembly 212 could be part of the second portion 203 and could move in response to movement of the floating portion 108. Meanwhile, the magnet 216 could be part of the first portion 201 and could be immovably attached to the fixed mount bracket 106. The overall assembly would still function similarly to the examples given in FIGS. 2-4 as the sense element 226 would still identify a distance to the respective magnets 216 (i.e. a magnetic field perceived by the sense element 226) which could be used to determine brake pad wear.

Referring now to FIGS. 5A and 5B, the various components of the sensor assembly 212 are shown. The sensor assembly 212 includes a housing 230 and cover 232 which can be attached to one another to form a chamber 234 to protect the electronics module assembly 224. The housing 230, cover 232, and electronics module assembly 224 all include axially aligned bore holes 236. Threaded fasteners 238 are inserted through the bore holes 236 to hold the cover 232, housing 230, and electronics module assembly 224 firmly together. The housing 230 and cover 232 can be made of a material such as plastic, aluminum, or the like, that is rigid and durable enough to protect the electronics module assembly 224 while also not interfering with any of the components on the electronics module assembly 224 such as the sense element 226. An epoxy potting 243 can be dispensed between the cover 232 and electronics module assembly 224 to help protect the components the components on the electronic module assembly 224 (however the epoxy potting 243 need not be included).

The electronics module assembly 224 includes printed circuit boards with various components related to sensing and signal processing and transmission (not all of which are distinctly shown/described). The electronics module assembly 224 derives power from an internal battery 240 and also includes antennas for wireless signal transmission. The entire sensor assembly 212 can bolted to the caliper assembly 102 of a typical brake system 100, as shown in FIGS. 2-4 by fastening the flange 242 of the housing 230 to the caliper assembly 102.

The magnet 216 of the sensing assembly 212 attaches to a separate portion of the caliper assembly 102 via the magnet carrier 228. In one embodiment, the magnet 216 can be rectangular and movement along the magnet axis "a" can be parallel to a sidewall 217 of the housing 230. However, the magnet 216 need not be any specific shape and can move in any direction with respect to the sensing assembly 212 (e.g. perpendicular or a direction neither perpendicular or parallel) as long as the relative positions of the sensing assembly 212 and magnet 216 are changed by the movement. The magnet 216 is formed from a material ideally suited to influence the sense element 226 such as an Alnico alloy. The magnet 216 is held within the magnet carrier 228 perpendicular to a mounting flange 244. The magnet carrier 228 is secured in place by the caliper bolts 110 passing through the mounting flange 244. As a result, the magnet 216 is coupled to the caliper assembly 102 in a way that allows movement of the magnet 216 in response to movement of the floating portions 108 in a substantially parallel direction (i.e. parallel to axis "a").

In some embodiments, the electronics module assembly 224 can also include a temperature sensor (not distinctly shown). The temperature sensor can be incorporated within the sense element 226, or can be placed at some other location on the electronics module assembly. The temperature sensor can help track information related brake pad temperature when the brakes are applied. Data related to brake pad temperature can then be provided to the user, for example via a display in the vehicle, so the driver can be alerted to an overheated condition. Similarly, brake pad temperature information can be tracked and stored and/or sent to an output to track brake pad usage by a particular driver or brake performance. Notably, since the temperature sensor is onboard the electronics module assembly 224, the temperature measurement will not be a direct temperature measurement of the brake pad itself. However, with proper characterization of the temperature sensor in the fixed location of the brake assembly, the temperature of the other components (e.g. rotor, pads, caliper housing, etc.) in the braking assembly can be inferred.

Referring now to FIGS. 6A-6E, various views of another brake assembly 100 and a sensor assembly 312 are shown. This brake assembly and sensor assembly 312 are very similar to the embodiments discussed above so that like components have the same reference numbers or similar reference numbers in the "300" series instead of the "200" series whenever possible. The following description is directed to the differences between the sensor assemblies 212, 312. The primary difference is that the magnet 316 can be cylindrical to allow for movement along the magnet axis "a" within a cylindrical channel 314 of the housing 330. The cylindrical shape allows for easier manufacturing and assembly. Further, movement along the magnet axis "a" of the cylindrically shaped magnet 316 through the cylindrically shaped channel 314 optimizes the perceived change in magnetic field of the sensor assembly 312 across the stroke of the brake system 100. Additionally, this results in improved accuracy and also helps to shield the magnet 316 from the effects of the harsh environment surrounding the brake system 100.

Figure 7A:
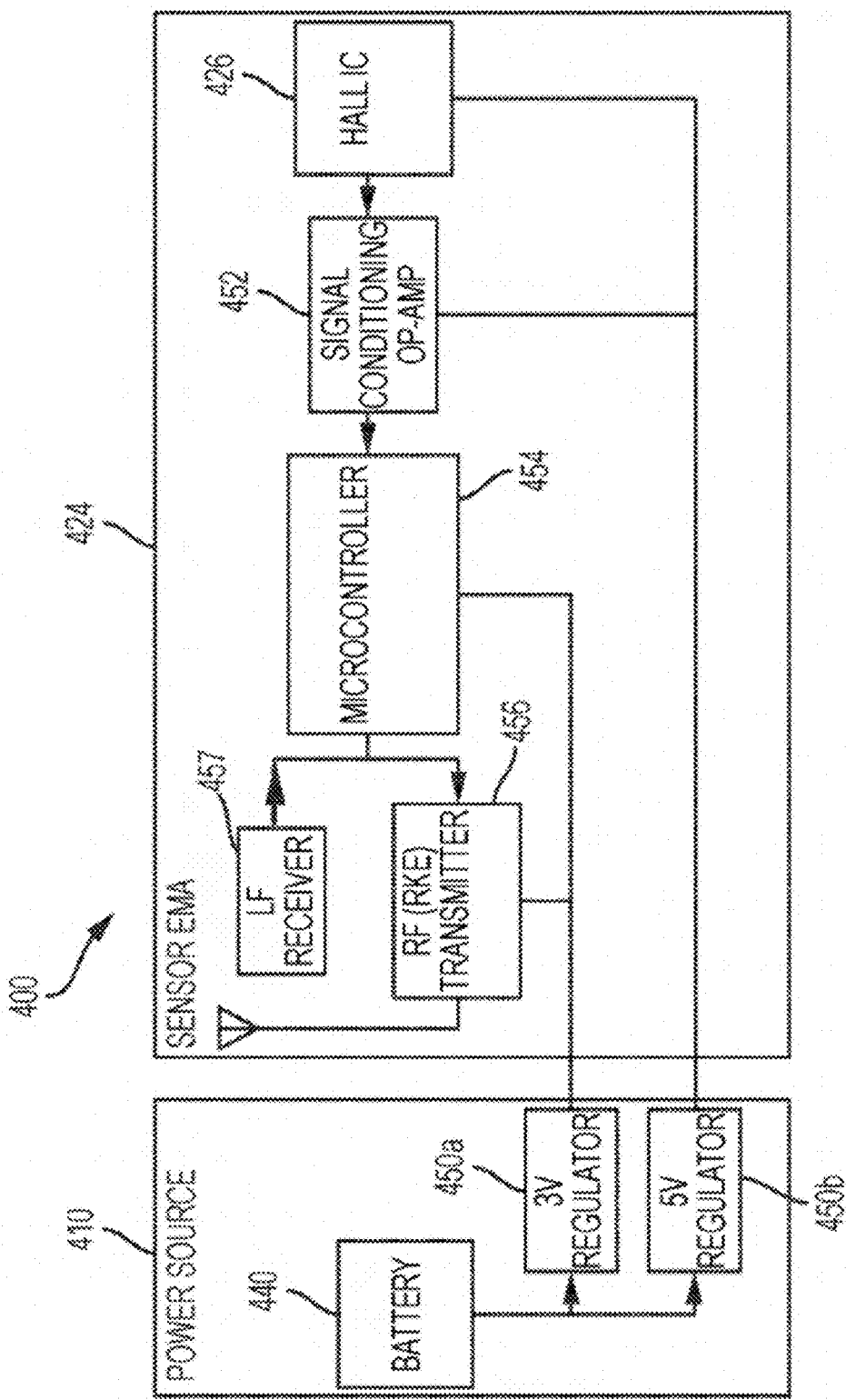
FIG. 7A is a simplified block diagram representing the electrical configuration of an electronics module assembly and battery in accordance with the subject technology.

Referring now to FIG. 7A, a block diagram 400 of one example of the circuitry of an electronics module assembly 424 and a corresponding power source 410. In this case, the power source 410 provides power from a battery 440 that is internal to the vehicle and external to the electronics module assembly 424. However, in other embodiments, an internal battery is included as a part of the electronics module assembly 424 to power the vehicle. The power source 410 includes a battery 440 coupled to a 3V regulator 450a and a 5V regulator 450b to supply power to the various components of the electronics module assembly 424. Power from the battery 440 passes through a particular voltage regulator 450a, 450b depending on the requirements of each particular component. In the example shown, power passes through a 5V regulator 450b to power the sense element 426 and a signal conditioning operational amplifier 452. Power passes through a 3V regulator to power a microcontroller 454 and RF transmitter 456.

The sensor element 426 detects the position of the respective magnet 216, 316 for generating a signal representing the position of that magnet 216, 316 with respect to itself. If the system is configured properly, this signal with bear a relationship to the overall wear of the brake pads of a vehicle. The signal is then sent through an operational amplifier 452 which then provides the signal to the microcontroller 454. The microcontroller 454 further processes the signal. The signal can then be provided to the RF transmitter 456 for wireless transmission to a vehicle display or other device. An LF receiver 457 also provides a one way communication channel back to the microcontroller 454, as well as other components within the electronics module assembly 424. The LF receiver 457 provides a means to initialize, test, and calibrate the electronics module assembly 424 as well as any corresponding sensor assembly. Preferably, the LF receiver 457 can be set into various modes of operation wirelessly to allow such initialization, testing and calibration.

Figure 7B:
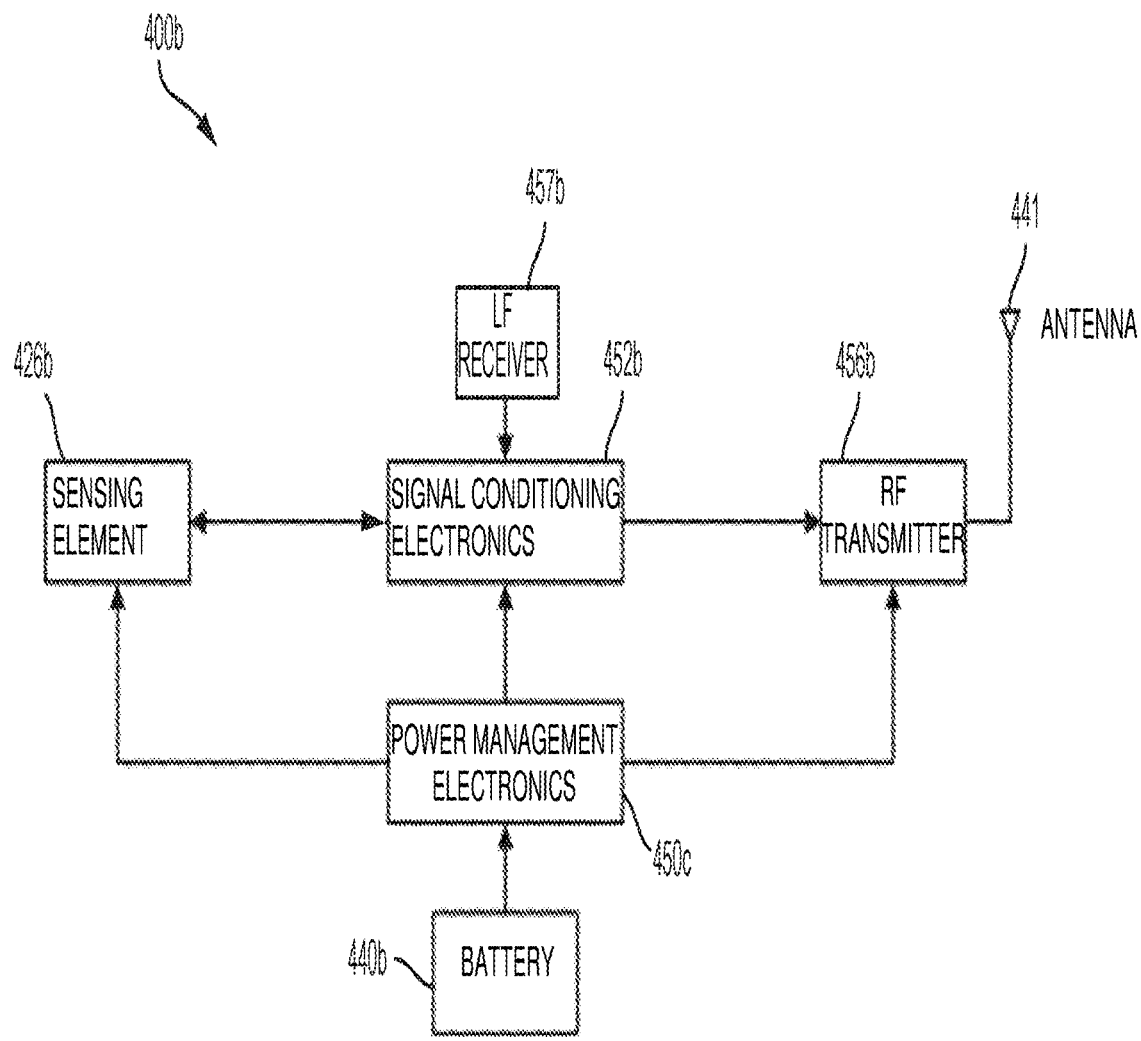
FIG. 7B is another simplified block diagram representing the electrical configuration of an electronics module assembly in accordance with the subject technology.

Referring now to FIG. 7B, a block diagram 400b of another example of the circuitry of an electronics module assembly 424 is shown. In this example, the electronics module assembly includes an internal battery 440b which powers some, or all of the other components shown on the block diagram 400b. The sense element 426b generates a signal, as discussed above, and provides that signal to signal conditioning electronics 452b. The signal conditioning electronics 452b can include various electronics to process, transmit, modify, or store signals generated by the sense element 426b. For example, the signal conditioning electronics 452b can include operation amplifiers, microcontrollers, or application specific integrated circuits programmed to take particular actions when signals falling within a certain range are received. The signal conditioning electronics 452b then provide the signal to the RF transmitter 456 for wireless transmission, via the antenna 441, to a vehicle display or other device. Similar to the LF receiver 457b described above, the LF receiver 457b also for initializing, testing, and calibration of the components within the electronics module assembly 424 and any corresponding sensor assembly. Notably, while not to distinctly shown, the electronics module assembly 424 may also include a temperature sensor. The temperature sensor can be a part of sense element 426b, or can similarly interface with the internal battery 440b and signal conditioning electronics 452b.

Referring now to FIGS. 8-10D, another embodiment of a position sensing system on a braking system is shown. The position sensing system has many similar components to the other systems described herein, and all components can be assumed to be the same unless otherwise shown or described. In general, while the other embodiments shown herein utilize magnetic position sensors and magnets, the embodiment shown uses an inductive position sensor assembly 512 and a metallic reference portion 560. Particularly, the sensor assembly 512 is configured to generate a signal having a strength correlative to a displacement distance between the metallic reference portion 560 and the sensor assembly 512 (or a portion of the sensor assembly 512, such as a sense element 526).

Similar to other embodiments described herein, the sensor assembly 512 includes a cover 532 and housing 530 which are coupled together to form a chamber 534 which contains an electronics module assembly 524. The electronics module assembly 524 has an inductive sense element 526 in the form of an arrangement of transmitting and receiving inductive coils which detect the distance to the position of a corresponding metallic reference portion 560. In the example shown, this metallic reference portion 560 is an integrated part of the floating portion 108 of the caliper assembly 102. Alternatively, or additionally, the metallic reference portion 560 can be a separate metallic protrusion attached to the floating portion 108 which can easily be detected by the inductive sense element 526. In general, the front face 562 of the cover 532 sits in close proximity to the metallic reference portion 560 (i.e. about 2 mm away).

Figure 8:
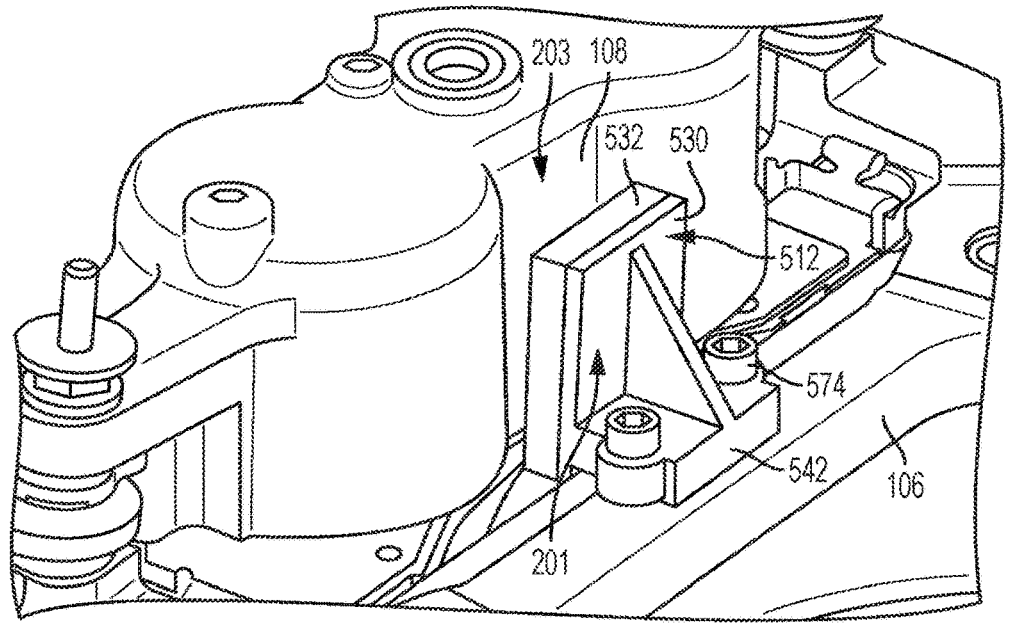
FIG. 8 is a perspective view of a braking system including an embodiment of a position sensing system in accordance with the subject technology.
Figure 9:
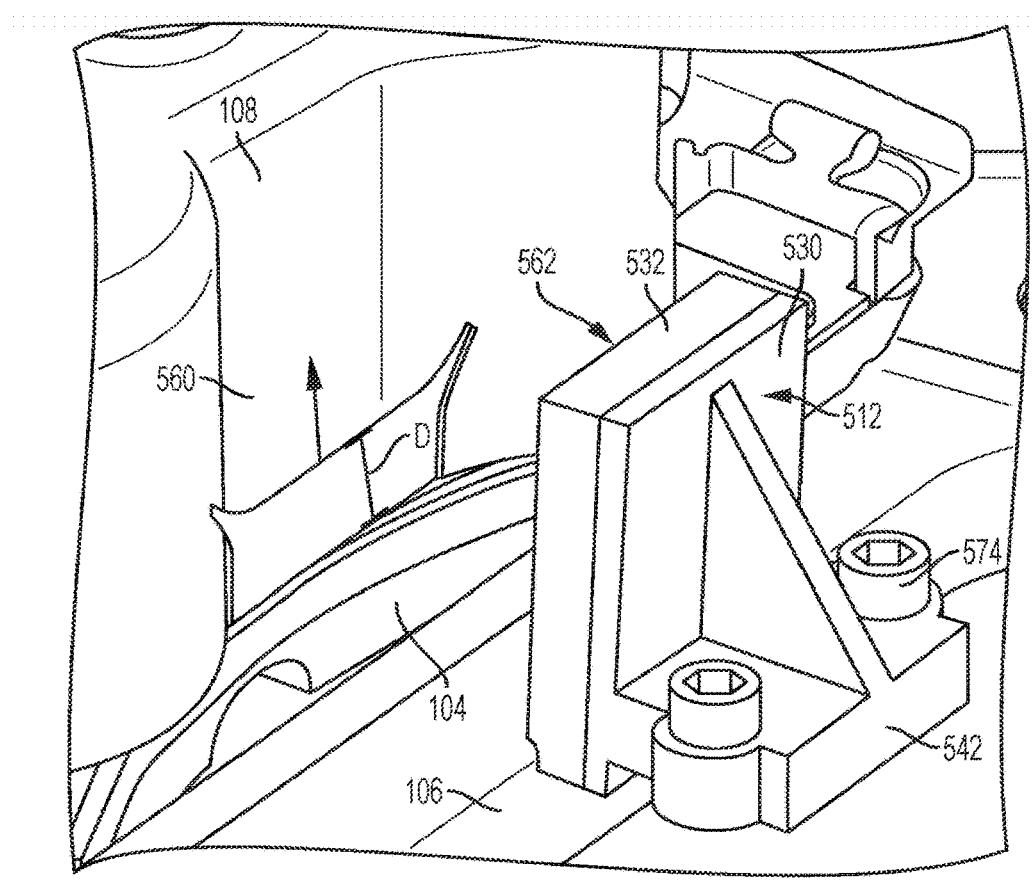
FIG. 9 is a perspective view of a braking system including an embodiment of a position sensing system in accordance with the subject technology.

When the brakes are not being applied, the metallic reference portion 560 is in a first, default position, as seen in FIG. 9. Once the brakes are applied, the floating portion 108 moves from the first default position into a second, active position as the floating portion 108 clinches the brake pads against the rotor 104, as shown in FIG. 8. This distance is represented by the displacement line "D", showing the travel of the floating portion 108 (and corresponding metallic reference portion 560) between when the brakes are and are not applied. Notably, in FIG. 9, the sensor assembly 512 has been moved back from the caliper assembly 102 to better illustrate the displacement distance "D", however it should be understood the sensor assembly 512 is still fixed to the caliper assembly 102 as shown in FIG. 8. In this example, the inductive sense element 526 is particularly configured on the electronics module assembly 524 such that the electronics module assembly 524 is positioned along a plane parallel to the direction of the displacement "D" of the floating caliper assembly 102. As the brake pads wear, the displacement "D" of the brakes will increase proportionally to the degree to which the brake pads have worn. Therefore by ensuring the displacement "D" corresponds to movement of the metallic reference portion 560, the sensor assembly 512 can be configured to determine the degree to which the brake pads have worn. Notably, while having a metallic reference portion 560 which travels parallel to front face 562 of the sensor assembly 512 has been found to be advantageous, in other embodiments the metallic reference portion 560 need only travel in a direction such that the relative position of the metallic reference portion 560 and sensor assembly 512 changes when the brakes are activated.

The electronics module 524 of this embodiment also includes various components for processing, transmitting, and analyzing signals from the inductive sense element 526. For example, the electronics module assembly 524 can include a printed circuit board, inductive sense element 526 (and corresponding transmitting and receiving inductive coils), an RF antenna, a wireless transmitter, and other passive electronic components. The electronics module assembly 524 also includes an internal battery 540 which is also housed within the chamber 534 formed between the housing 530 and the cover 532. The battery 540 provides power to the electronics module assembly 524, eliminating the need to connect the electronics module assembly 524 to any power supply within the vehicle.

The housing 530 includes a flange 542 which allows for easy attachment of the sensor assembly 512 to the fixed mount bracket 106. For example, the flange 542 can include axial bores 572 with threaded interiors. Screws 574 can be threaded through the axially bores 572 directly into the fixed mount bracket 106 to hold the sensor assembly 512 firmly in place. Similarly, the screws 574 can be easily removed to detach the sensor assembly 512, for example, when changing calipers 102, servicing the sensor assembly 512, or otherwise as needed. The two bore holes 572 shown are positioned on opposite sides of the flange 542 for improved stability of the sensing assembly 512 when the sensor assembly 512 is fixed to the caliper assembly 102. Notably, in some embodiments, the housing 530 and/or cover 532 need not be solid plastic members, but instead, can be formed from soft epoxy layers. The soft epoxy layers can allow for improved wireless signal transmission to and/or from the sensor assembly 512, while still protecting the electronics module assembly 524 from the harsh environment surrounding the braking system.

Figure 11:
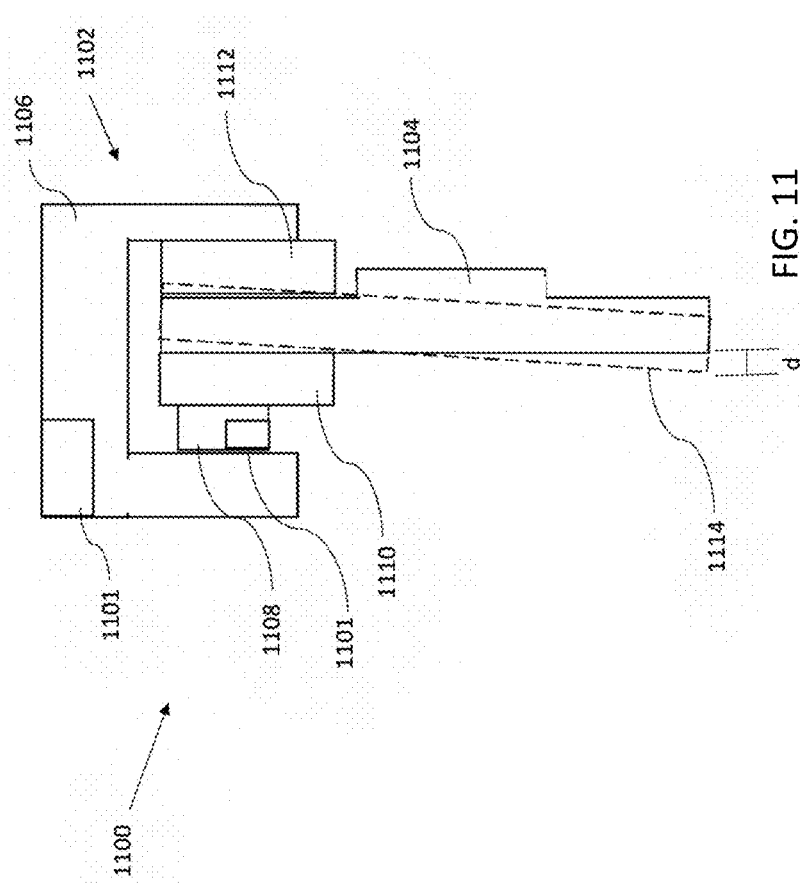
FIG. 11 is a schematic cross sectional diagram of an exemplary braking system for a vehicle including a position sensing system in accordance with the subject technology.

Referring now to FIG. 11, a schematic diagram of an exemplary braking system 1100 for a vehicle including a position sensing system 1101 in accordance with the subject technology is shown. The braking system 1100 can be one of the many types of braking systems shown and described herein, or as are known in the art. A caliper assembly 1102 is disposed at least partially around a rotor 1104. The caliper assembly 1102 includes a fixed mount bracket 1106 which is at a fixed location with respect to the braking system 1100 and does not move when the vehicle brakes are applied. The caliper assembly 1102 also includes a floating portion 1108, such as a piston attached to a brake pad 1110 which opposes a second brake pad 1112 around the rotor 1104. When the vehicle brakes are applied the floating portion 1108 is actuated and the brake pad 1110 is driven against the rotor 1104 to slow the vehicle.

The position sensing system 1101 includes a sensing element and a reference portion. The sensing element can be one of the various types of sensing elements shown and described herein, the reference portion being a corresponding target for the sensing element. For example, the sensing element can be an inductive sensor and the reference portion can be a metallic reference (e.g. a metal member and/or structural support recognizable by the inductive sensor). Alternatively, the reference portion can be a magnet generating a magnetic field and the sensing element can be configured to sense the magnetic field generated by the reference portion. Other sensing elements and reference portions, as are known in the art, can also be employed. In general, the sensing element and reference portion allow the sensor assembly to generate a signal having a strength correlative to the relative positions of the sensing element and reference portion. In various embodiments, the position sensing system 1101 may also include an electronics module assembly including the sense element, a printed circuit board, an antenna, a battery, and a wireless signal transmitter configured to send data from the processor to external electronics.

The sensing element can be positioned on either the fixed mount bracket 1106 or the floating portion 1108. The reference portion is positioned on the opposite portion of the caliper assembly 1102 from the sensing element, such that the reference portion moves in relation to the sensing element when the floating portion moves, causing the sensor assembly to generate a signal when the brakes are applied. That is, if the sensing element is attached to the fixed mount bracket 1106, the reference portion is attached to the floating portion 1108, and if the sensing element is attached to the floating portion 1108 the reference portion is attached to the fixed mount bracket 1106.

The position sensing system 1101 also includes a processor (not distinctly shown) configured to carry out various functions associated with determining a condition of a component of the vehicle, as described in more detail herein. For simplicity, a single processor is described herein, it being understood that the tasks described could alternatively be carried out by multiple processors. In general, the processor is configured to store at least one predetermined signature associating a signal waveform with a condition of a component of the vehicle. The processor then takes the signal measured by the sensor assembly and compares it to the predetermined signatures. When there is a match between the signal and one of the predetermined signatures, a condition of a component of the vehicle can be determined based on the match, as discussed in more detail below. In some cases many predetermined signatures can be stored, each associated with different conditions of different components of the vehicle such that various signals generated by the sensor can be indicative of one or more conditions of one or more components of the vehicle.

For example, FIG. 11 includes a dotted block 1114 which depicts a possible orientation for a rotor experiencing an abnormal rotor condition. More particularly, reference numeral 1104 represents an orientation of a healthy rotor while dotted block 1114 depicts a rotor experiencing runout of distance "d." By comparing the signal from the sensor with one or more predetermined signatures, the position sensing system 1101 can identify that the rotor is experiencing runout, as will be discussed in more detail below. In some cases, enough specific predetermined signatures are catalogued that the position sensing system 1101 can even determine the distance "d" of runout experienced by the rotor. While ways in which the position sensing system 1101 can determine conditions of components of the vehicle are described herein, it should be understood that the disclosed position sensing system 1101 can also be used to determine the conditions of the components of the vehicle in ways not specifically described herein as would be understood by one of skill in the art.

Figure 12:
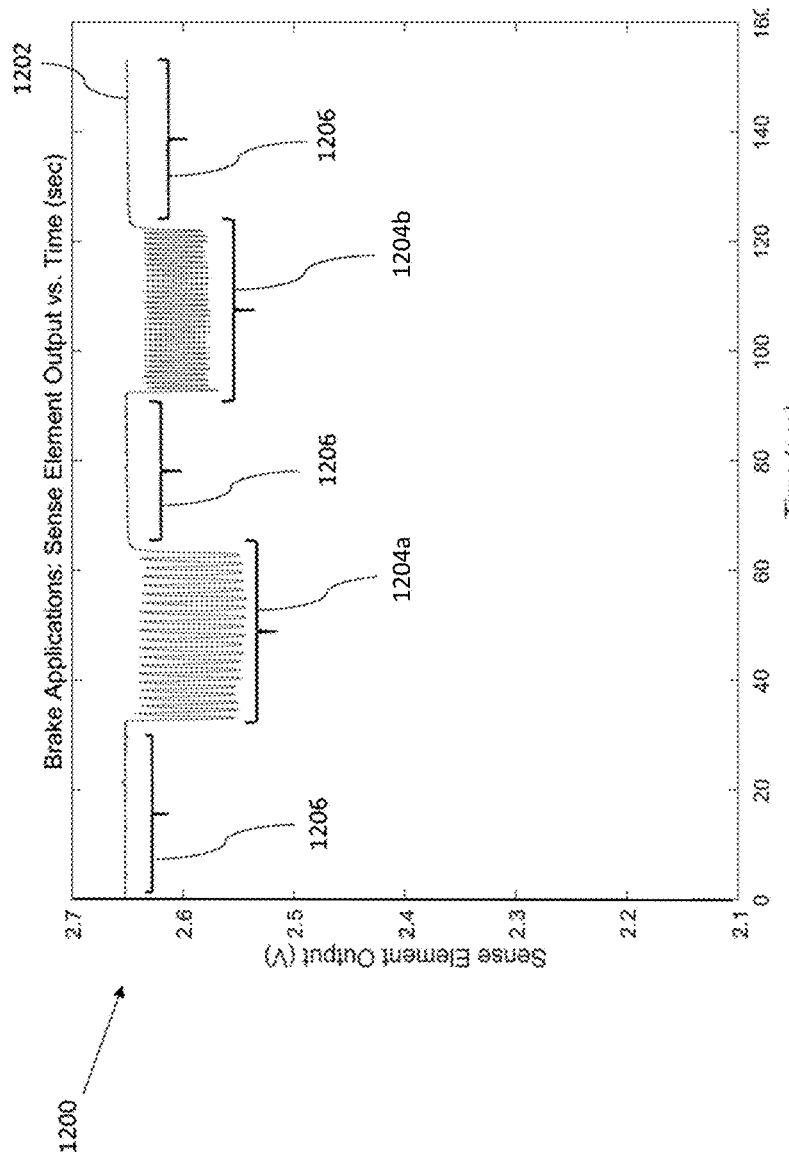
FIG. 12 is a graph showing strength of a sensor assembly signal in accordance with the subject technology over time during various braking applications.

Referring now to FIG. 12, an exemplary graph 1200 showing the strength of the signal generated by the sensor assembly over time (graph line 1202) is shown during various states of brake application. When the brakes are not being applied, as seen over periods 1206, the signal strength is relatively constant (i.e. of an unchanging value). During an application of the brakes, the signal strength changes from the relatively constant value to a fluctuating value as seen over periods 1204a, 1204b (generally 1204), deviating from the normal value during the time periods 1206 where the brakes are not being applied. Further, a harder and/or more rapid application of the brakes will tend to produce a larger fluctuation in signal strength (e.g. 1204a) while a light and/or more gradual application of the brakes will tend to produce a small fluctuation in signal strength (e.g. 1204b). The fluctuation in the signal 1202 is exemplary of a health rotor of a vehicle.

The signal generated by the sensor is compared to the predetermined signatures to determine information about components of the vehicle in different ways, as will be discussed in more detail below. For example, in one application, the processor can be configured to determine a frequency of the signal over a given time period. The processor can then determine whether a component, such as a rotor or wheel bearing proximate to the sensing assembly, needs to be replaced based on whether the frequency falls outside of a predetermined range. In another example, the processor is configured to detect when a wheel bearing is compromised by comparing a measurement of the signal to predetermined signals indicative of wheel bearing issues. Damaged, or otherwise compromised rotors create/cause excessive runout, which in turn induces non-uniform, high stresses within components like wheel bearings. This increased and/or non-uniform loading is one of the most common causes of wheel bearing damage. Therefore particular patterns associated with wheel bearing issues can also be exemplary, or predictive of, other issues with the braking system. Taking early action on these issues can provide a significant benefit for the vehicle owner such as avoiding additional damage and costs related to wheel bearing replacement, tires, alignment, etc. In any case, all determinations of the conditions of components of the vehicle can be reported so that a user and/or mechanic may take action. This can be accomplished by providing alerts over a vehicle display and/or warning lights on a dashboard or center console.

Figure 13:
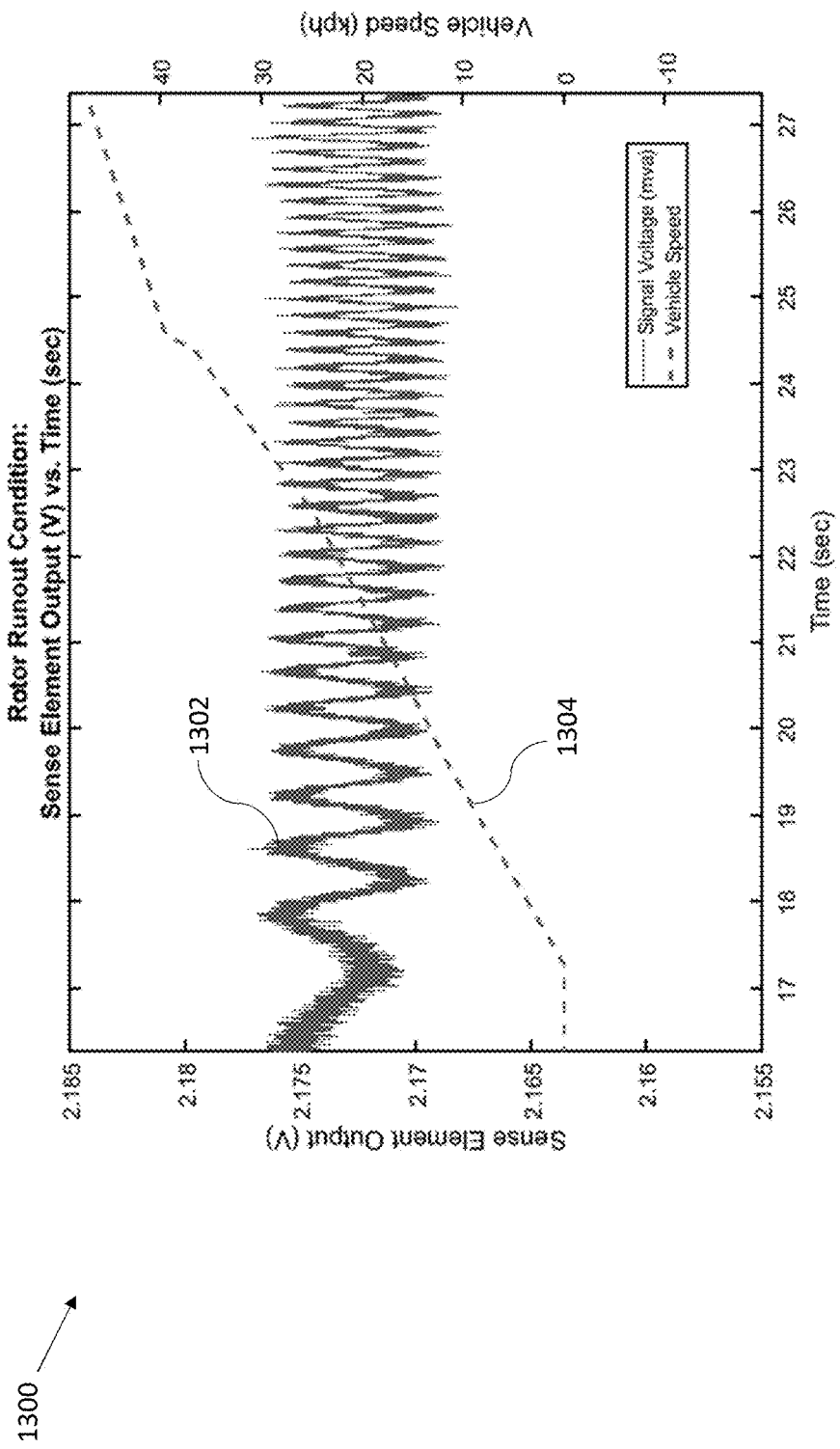
FIG. 13 is a graph showing signal strength as measured by a position sensing system in accordance with the subject technology and vehicle speed over time.
Figure 15E:
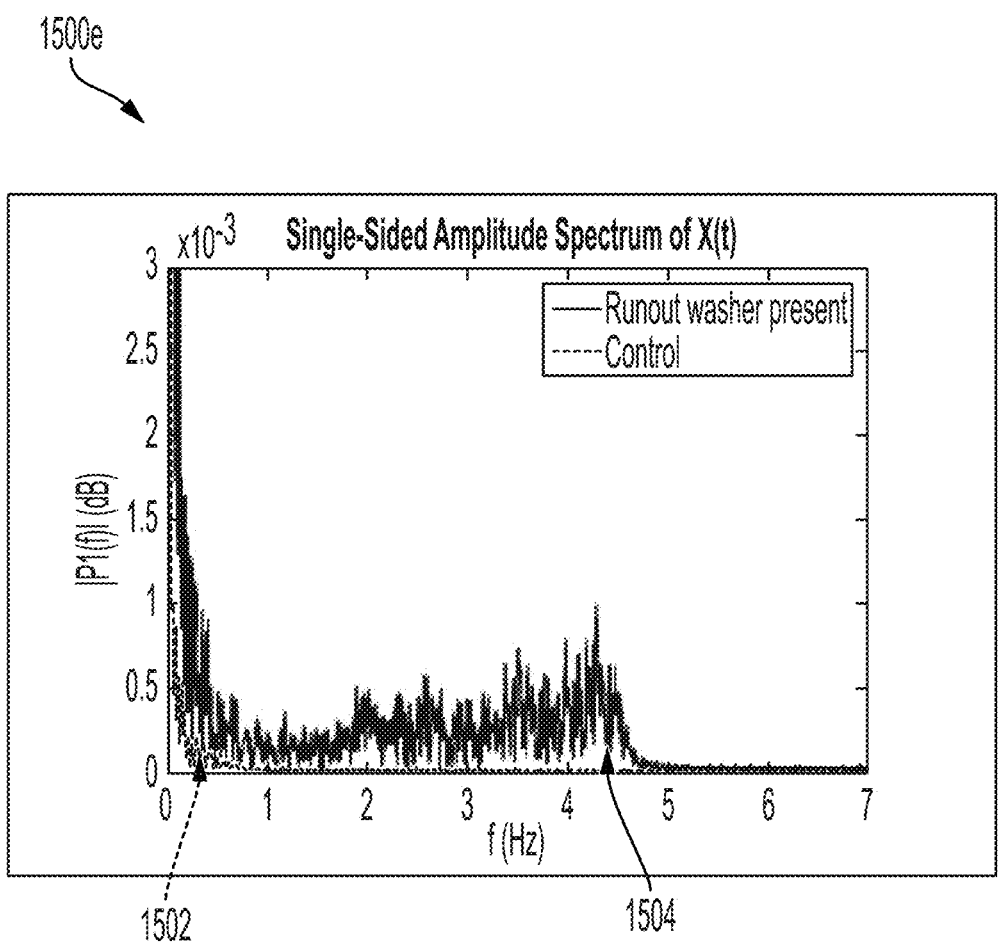
FIG. 15e is a graph showing the signals of FIG. 15a and FIG. 15c converted into the amplitude-frequency domain.

In another example, the signal from the sensor can be used to determine a vehicle speed. Referring now to FIG. 13, a graph 1300 shows the strength of the sensor signal over time (graph line 1302), as tracked by the position sensing assembly, and the actual vehicle speed over time (graph line 1304). As the speed of the vehicle 1304 increases over time, the frequency of the sensor signal 1302 increases accordingly. This is graphically depicted by the sensor signal 1302 peaks being closer together as time passes (and the vehicle speed 1304 increases). Thus, there is a correlation between the frequency of the signal 1302 and the vehicle speed 1304. As such, the processor of the position sensing system 1101 can be further configured to determine the frequency of the signal 1302, and determine a speed of the vehicle 1304 based on the frequency of the signal 1302.

In some cases, the position sensing system 1101 can also detect a non-uniform rotor contact surface. Referring now to FIGS. 14a-14d, graphs of the sensor signal strength over time are shown being converted into a plot of the signal in an amplitude-frequency domain. The graph 1400a is an example of sensor output over time during a vehicle speed of substantially 25 kilometers per hour. Notably, the signal strength fluctuates even when the brakes are not applied (substantially 7 mV peak to peak), although the fluctuation is more pronounced when the brakes are applied (substantially 10 mV peak to peak). FIG. 14b shows a graph 1400b of a signal sample from the period depicted in graph 1400a, the sample converted into an amplitude-frequency domain using a fast Fourier transform (FFT). Similarly, the graph 1400c of FIG. 14c is an exemplary of sensor output over time during a vehicle speed 35 kilometers per hour, showing peak to peak voltages of substantially 5 mV when the breaks are not applied and 7 mV when the brakes are applied. FIG. 14d is a graph 1400d of a sample from graph 1400c converted into an amplitude-frequency domain using a FFT.

Graphs 1400a-d show examples where a non-uniform rotor contact surface exists. Non-uniform contact surface can refer to either a rotor which is displaced off its normal axis of rotation, a rotor that is worn unevenly, or other issues causing non-uniform contact, such as bearing issues. A non-uniform contact surface can be identified by comparing the signal from the sensor with the predetermined signatures stored in the processor. This is done by converting the sensed signal (e.g. graphs 1400a, 1400c) into the amplitude-frequency domain (1400b, 1400d) and identifying an abnormal peak, such as peaks 1402b, 1402d. Peaks occur regardless of brake application and vehicle speed, although brake application might cause result in peaks 1402b, 1402d being found at different frequencies. In any case, the peaks 1402b, 1402d are normally found to be exemplary of a non-uniform rotor contact surface when found at a frequency approximately between 2-10 Hz, dependent on vehicle configuration and speed.

Referring now to FIGS. 15a-15e, graphs 1500a-1500e show another example of how a fluctuation in signal strength can be used to determine a potential non-uniform rotor contact surface such as rotor runout. Graph 1500a is exemplary of a sensor associated with a braking system that is not experiencing significant issues with non-uniform rotor contact surfaces, while graph 1500c is exemplary of a braking system experiencing a significant non-uniform rotor contact surface issue. Graphs 1500a, 1500c show an exemplary signal from the sensor over a time period of over 100 seconds and during varying brake applications, speeds, and steering wheel angles. Graph 1500*b* is a sample of just over 10 seconds from the graph 1500*a*, while graph 1500*d* is a sample of just over 10 seconds from the graph 1500*c*. In graph 1500*b*, which is representative of a signal from a normal rotor, the signal is dominated by noise rather than the pulsations that are characteristic of a rotor condition. By contrast, the rotor experiencing a non-uniform contact surface (graph 1500*d*) results in a peak-peak frequency of the signal dominating over the other signal noise. This is because the displaced rotor causes the brake pads to pulsate each cycle of the rotor, causing a high and low peak at opposite ends of the pulsation cycle. Therefore the pattern shown in graph 1500*d* is exemplary of a rotor experiencing an abnormal condition, such as runout. The processor within the position sensing system 1101 can store one or more predetermined signatures related to patterns of fluctuations that allow rotor conditions to be identified. The abnormal condition can then be identified based on a match between the strength of the signal and one of the predetermined signatures for an abnormal rotor condition, such as rotor runout. In this way, the processor can analyze the signal to detect an unhealthy rotor and/or potentially an end of life condition and alert a driver or vehicle mechanic that the rotor requires service or replacement.

Graph 1500*e* shows both the signal from the braking system with a normal rotor (i.e. from graphs 1500*a*, 1500*b*), represented by graph line 1502, and the signal from the braking system with a rotor experiencing a non-uniform contact surface (i.e. from graphs 1500*c*, 1500*d*), represented by graph line 1504. The signals have been converted into an amplitude-frequency domain using a FFT. The converted signal 1502 for the normal system shows minimal peaks at dominant frequencies, while the converted signal 1504 from the rotor with the non-uniform contact surface has substantial amplitude between 2-5 Hz. The vehicle in this example is traveling at less than 40 kilometers per hour, which results in the peaks for the signal 1504 being at less than 5 Hz. There is no distinct peak, but the pattern of peaks clearly differentiates the signal 1504 from that of a normal rotor 1502. Therefore the processor can be configured to detect patterns of signal peaks, particularly in the amplitude-frequency domain, such as those formed by graph line 1504, to identify a non-uniform rotor contact surface. Notably, while non-uniform rotor contact surface is used by way of example, various signal patterns in the amplitude-frequency domain can also suggest other conditions, such as problems with the brake pads or bearings.

Figure 16:
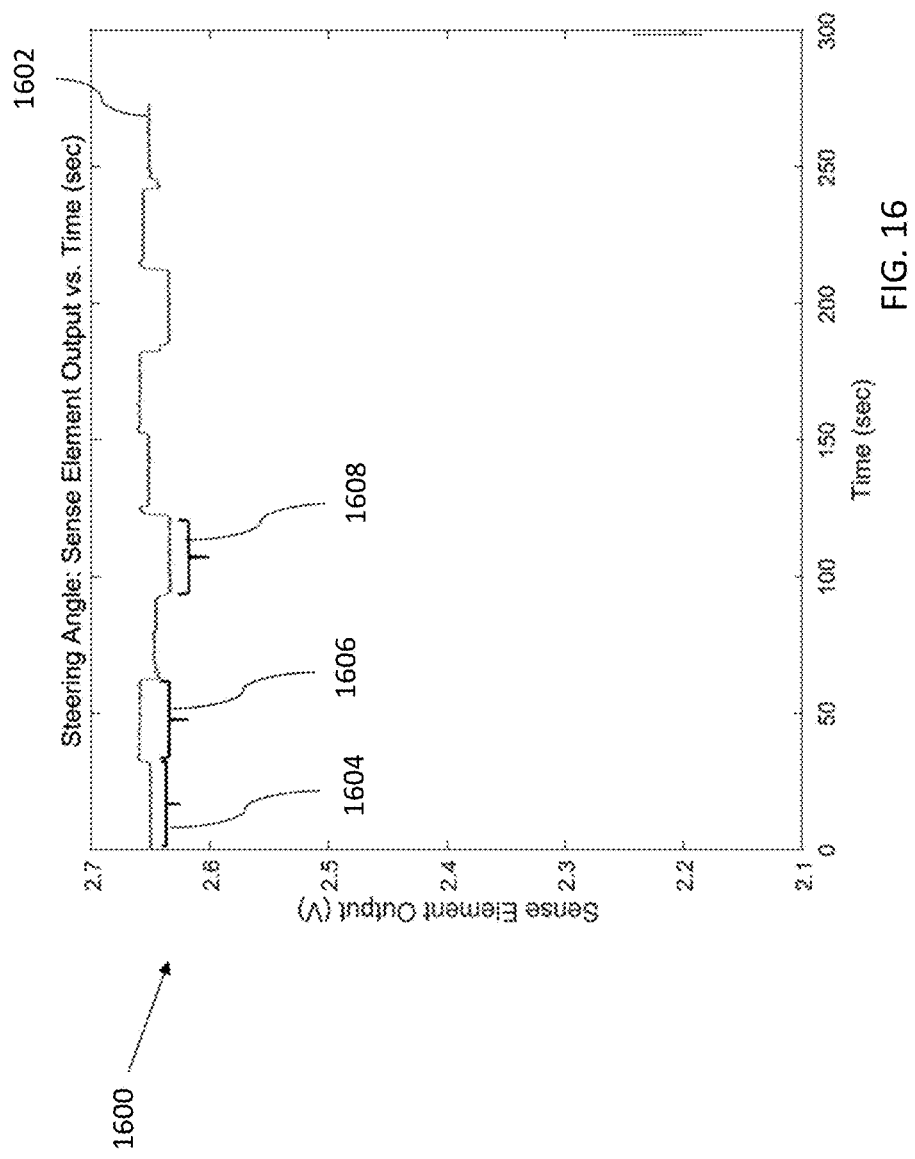
FIG. 16 is a graph showing strength of a sensor assembly signal in accordance with the subject technology over time when a tire or wheel is turned at different angles.

Referring to FIG. 16, a graph 1600 shows the strength of the signal generated by the position sensor assembly over time during different steering angles (i.e. the tires/wheel being at particular angles). The signal strength is represented generally by graph line 1602. When the wheel is substantially straight, the sensor assembly generates a substantially constant signal within a small range, as shown during period 1604. Similarly, when the wheel is turned at a left angle (e.g. when the vehicle is making a left turn) the sensor assembly generates a substantially constant signal within a different small range, as shown during period 1606, at a slightly higher voltage than when the wheel is straight. And when the wheel is turned at an angle to the right, the sensor assembly generates a substantially constant signal within a different small range, as shown during period 1608, at a slightly lower voltage than when the wheel is straight. Therefore, in some embodiments, the predetermined signatures can include three separate output ranges associated with a straight steering angle, a left steering angle, and a right steering angle, respectively. Further, predetermined signatures can be included to specify even more steering ranges, such as predetermined signatures distinguishing hard left steering angles from slight left steering angles and/or vice versa. The processor can then be further configured to determine a steering angle over a set time period based on a match between the signal and the predetermined signatures.

Figure 17:
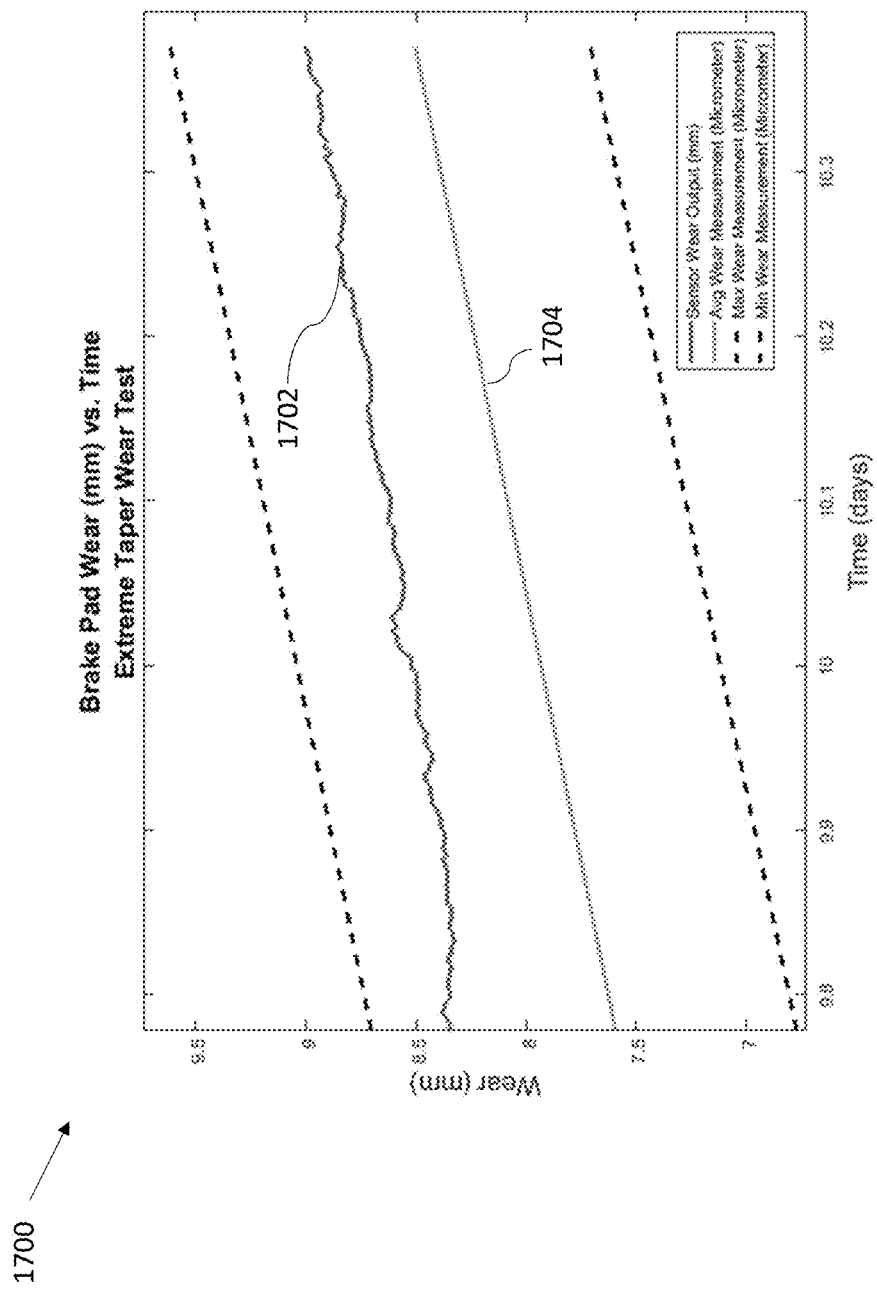
FIG. 17 is a graph showing a moving average of signal strength as measured by a position sensing system in accordance with the subject technology and brake pad wear over time.

Referring now to FIG. 17, another example is provided of how the sensor signal can be relied upon to gather information about the components of the vehicle. Graph 1700 shows exemplary test data from a sensor signal (moving average given by graph line 1702), as well as exemplary hand taken measurements of brake pad wear, given by graph line 1704. The sensor signal 1702 is plotted over longer than half a day, which is a much longer time period than the examples given above. To create a more accurate representation of the signal, outliers have been removed from the data collected by the sensor. As can be seen, the average signal 1702 produced by the sensor increases steadily over longer time periods (in this case, about a half of a day of substantial brake usage). Therefore the processor can be configured to include predetermined signatures related to various thresholds. When a moving average of the signal strength over a longer time period (i.e. a few hours, a day, multiple days, etc.) exceeds at least one threshold, the processor can determine that the brake pads have worn to a level warranting an alert to the user. In some cases, the processor can contain many predetermined signatures with different thresholds, the processor being configured to determine substantially the actual amount of wear on the brake pads.

Referring again to FIG. 11, the position sensing system 1101 can also include a temperature sensing element configured to detect temperature proximate to the braking sensing system 1100. Therefore when a temperature sensing element is included, the processor can be configured to store predetermined temperature signatures associating temperature with a particular condition of at least one component of the vehicle. The processor can then determine a condition of a component of the vehicle based on a match between the detected temperature and one of the predetermined temperature signatures. For example, the processor can store at least one threshold temperature corresponding to a severe braking application. The processor can then determine, based on the detected temperature, when a severe braking application has occurred. A severe braking application generally relates to a situation where there is a chance the brakes will overheat. Thus, certain temperature signatures can corresponding to atypical drive profiles, such as a vehicle descending down a steep gradient for a long duration of time while towing a trailer behind (e.g. mountain descent) or performing race-like driving conditions (e.g. track driving). If the atypical drive profile is detected, this data can be used to change the state of the sensor or the vehicle. For example, the sensor could be modified to provide more frequent updates to the vehicle and/or processors within the vehicle may provide additional diagnostics on incoming sensor data.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., electronics, sense elements, transmitters, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A position sensing system for a braking assembly for a vehicle,
   the braking assembly including:
   a rotor;
   a caliper assembly disposed at least partially around the rotor and having a fixed mount bracket and a floating portion which is movable in relation to the fixed mount bracket; and
   at least one brake pad attached to the floating portion configured to move with respect to the fixed mount bracket and exert a force against the rotor when a driver applies brakes for the vehicle,
   the position sensing system comprising:
   a sensor assembly including a sensing element and a reference portion, the sensing element attached to a location of the braking assembly such that the reference portion moves in relation to the sensing element when the floating portion moves, the sensor assembly configured to generate a signal correlative to the relative positions of the sensing element and the reference portion; and
   a processor configured to:
   store a plurality of predetermined signatures, each of which associates a pattern of signal strength over time in a signal waveform with a condition of a component of the vehicle;
   convert the signal into an amplitude-frequency domain; and
   determine that the rotor has a non-uniform rotor contact surface based on a comparison of fluctuations in signal strength in the converted signal with a first predetermined signature of the plurality of predetermined signatures, the first predetermined signature including an amplitude-frequency waveform having abnormal amplitude spikes at particular frequencies dependent on vehicle speed.

2. The position sensing system of claim 1, wherein:
   the sensing element is an inductive sensor assembly coupled to the fixed mount bracket; and
   the reference portion is a metallic reference portion coupled to the floating portion.

3. The position sensing system of claim 1, wherein:
   the reference portion is a magnet that generates a magnetic field; and
   the sensing element is a magnetic sense element configured to sense the magnetic field of the magnet to generate the signal.

4. The position sensing system of claim 1, wherein the processor is further configured to:
   determine a frequency of the signal over a time period; and
   determine failure of a component in the brake assembly based on whether the frequency falls outside of a predetermined frequency range.

5. The position sensing system of claim 4, wherein the processor is further configured to determine whether a wheel bearing proximate to the sensing assembly needs to be replaced based on whether the frequency falls outside of the predetermined frequency range.

6. The position sensing system of claim 1, wherein the processor is further configured to:
   determine a frequency of the signal; and
   identify a speed of the vehicle based on the frequency of the signal.

7. The position sensing system of claim 1, wherein:
   the sensor assembly includes a temperature sensing element configured to detect temperature; and
   the processor is further configured to:
   store at least one threshold temperature corresponding to a severe braking application; and
   determine, based on the at least one threshold temperature and a temperature detected by the temperature sensing element, if a severe braking application has occurred.

8. The position sensing system of claim 1, wherein:
   the sensor assembly includes a temperature sensing element configured to detect temperature; and
   the processor is further configured to:
   store at least one predetermined temperature signature associating a particular temperature with a condition of a component of the vehicle; and
   determine a condition of a component of the vehicle based on a match between a detected temperature and the particular temperature of the at least one predetermined temperature signature.

9. The position sensing system of claim 1, wherein at least one predetermined signature of the plurality of predetermined signatures associates a worn brake pad with a moving average of the signal exceeding a threshold value.

10. A method for determining a condition of a component of a vehicle, the vehicle including a braking assembly including: a rotor; a caliper assembly disposed at least partially around the rotor and having a fixed mount bracket and a floating portion which is movable in relation to the fixed mount bracket; and at least one brake pad attached to the floating portion configured to move with respect to the fixed mount bracket and exert a force against the rotor when a driver applies brakes for the vehicle, the method comprising:
    providing a sensor assembly with a sensing element and a reference portion;
    attaching the sensing element to a location of the braking assembly such that the reference portion moves in relation to the sensing element when the floating portion moves;
    configuring the sensor assembly to generate a signal correlative to the relative positions of the sensing element and the reference portion;
    determining, by the processor, a frequency for the signal over a time period; and
    determining whether a wheel bearing proximate to the sensing assembly needs to be replaced based on whether the frequency falls outside of a predetermined frequency range of a first predetermined signature of a plurality of predetermined signatures.

11. The method of claim 10, further comprising:
    storing the plurality of predetermined signatures;
    wherein each predetermined signature of the plurality of predetermined signatures associates a pattern of signal strength over time with the condition of at least one component of the vehicle.

12. The method of claim 10, wherein:
    the sensor assembly includes a temperature sensing element configured to detect temperature;
    the processor stores at least one threshold temperature corresponding to a severe braking application;

the processor determines, based on the at least one threshold temperature and a temperature detected by the temperature sensing element, if a severe braking application has occurred.

13. The method of claim 11, wherein:

at least one predetermined signature of the plurality of predetermined signatures includes an amplitude-frequency waveform; and the processor converts the signal into an amplitude-frequency domain and identifies a condition of a component of the vehicle based on a comparison of the converted signal with one or more predetermined signatures of the plurality of predetermined signatures.

14. The method of claim 11, wherein at least one predetermined signature of the plurality of predetermined signatures associates a worn brake pad with a moving average of the signal exceeding a threshold value.

* * * * *